(12) United States Patent
Koorapaty et al.

(10) Patent No.: US 11,743,944 B2
(45) Date of Patent: *Aug. 29, 2023

(54) LBT PARAMETERS FOR UPLINK IN UNLICENSED SPECTRUM

(71) Applicant: Telefonaktiebolaget LM Ericsson (publ), Stockholm (SE)

(72) Inventors: Havish Koorapaty, Saratoga, CA (US); Sorour Falahati, Stockholm (SE); Jung-Fu Cheng, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 192 days.

This patent is subject to a terminal disclaimer.

(21) Appl. No.: 17/391,610

(22) Filed: Aug. 2, 2021

(65) Prior Publication Data

US 2021/0360699 A1 Nov. 18, 2021

Related U.S. Application Data

(63) Continuation of application No. 16/099,272, filed as application No. PCT/IB2017/052646 on May 5, 2017, now Pat. No. 11,083,017.

(Continued)

(51) Int. Cl.
*H04W 74/08* (2009.01)
*H04L 1/1607* (2023.01)
(Continued)

(52) U.S. Cl.
CPC ....... *H04W 74/0816* (2013.01); *H04L 1/1692* (2013.01); *H04L 1/1812* (2013.01);
(Continued)

(58) Field of Classification Search
CPC ......... H04W 74/0816; H04W 72/0446; H04W 74/0808; H04W 72/0453; H04W 72/042;
(Continued)

(56) References Cited

U.S. PATENT DOCUMENTS

2018/0124749 A1* 5/2018 Park ................. H04W 74/08
2019/0150196 A1 5/2019 Koorapaty et al.

FOREIGN PATENT DOCUMENTS

CN 105519225 A 4/2016
WO 2014189912 A1 11/2014

OTHER PUBLICATIONS

Huawei et al: "Contention window size 1-5, adjustment for UI category 4 IBT for B-14,17 , eIAA". 3GPP Draft ; RI-162129, 3rd Generation Partnership Project (3GPP), Mobile Competence Centre 650, Route Des Iucioies , F-06921 Sophia-Antipolis Cedex; France (Year: 2016).*

(Continued)

*Primary Examiner* — Hardikkumar D Patel
(74) *Attorney, Agent, or Firm* — Withrow & Terranova, PLLC

(57) ABSTRACT

According to some embodiments, a method for use in a user equipment (UE) of managing a listen-before-talk (LBT) contention window size comprises receiving scheduling for a current burst of contiguous uplink subframes. For each subframe the scheduling comprises an associated hybrid automatic repeat request (HARQ) process identifier and a new data indicator (NDI). The method determines a reference subframe based on a previously-scheduled burst of contiguous uplink subframes. The reference subframe is associated with a reference HARQ process identifier. When the UE determines the HARQ process identifier associated with a subframe of the current scheduled burst of contiguous uplink subframes matches the reference HARQ process identifier and the NDI indicates new data, the method resets the LBT contention window. When the reference HARQ process identifier matches, but the associated NDI indicates a retransmission, or the HARQ process identifier does not match, the method increments the LBT contention window.

20 Claims, 14 Drawing Sheets

Related U.S. Application Data

(60) Provisional application No. 62/332,846, filed on May 6, 2016.

(51) Int. Cl.
*H04L 1/1812* (2023.01)
*H04L 1/1829* (2023.01)
*H04W 72/0446* (2023.01)

(52) U.S. Cl.
CPC ....... *H04L 1/1832* (2013.01); *H04W 72/0446* (2013.01); *H04W 74/0808* (2013.01)

(58) Field of Classification Search
CPC . H04W 72/1257; H04W 76/15; H04W 72/04; H04L 1/1692; H04L 1/1812; H04L 1/1832; H04L 41/145; H04L 41/0873; H04L 41/0893; H04L 41/0866; H04L 41/12; H04L 41/0853; H04L 41/147; H04L 41/142; H04L 41/0631; H04L 43/0823; H04L 43/10; H04L 41/16; H04L 41/0654; H04L 41/22; H04L 41/50; H04L 45/22; H04L 45/28; H04L 45/38; H04L 45/42; H04L 45/64; H04L 63/101; H04L 63/20; H04L 12/4641; H04L 41/0266; H04L 41/06; H04L 41/0677; H04L 41/0681; H04L 41/08; H04L 41/0806; H04L 41/082; H04L 41/0823; H04L 41/0886; H04L 41/5054; H04L 43/04; H04L 45/02; H04L 63/0209; H04L 63/1425; H04L 12/1407; H04L 41/0233; H04L 41/044; H04L 41/046; H04L 41/0604; H04L 41/0613; H04L 41/0618; H04L 41/0636; H04L 41/064; H04L 41/0668; H04L 41/0686; H04L 41/069; H04L 41/0803; H04L 41/0813; H04L 41/20; H04L 41/5003; H04L 41/5009; H04L 41/5022; H04L 41/5025; H04L 41/5051; H04L 43/06; H04L 43/08; H04L 43/0805; H04L 43/0811; H04L 43/0817; H04L 43/0876; H04L 43/12; H04L 45/00; H04L 45/14; H04L 45/306; H04L 45/58; H04L 45/586; H04L 45/66; H04L 45/745; H04L 45/7457; H04L 47/00; H04L 47/10; H04L 47/11; H04L 47/125; H04L 49/15; H04L 61/20; H04L 63/02; H04L 63/0227; H04L 63/0272; H04L 63/0823; H04L 63/10; H04L 63/104; H04L 63/107; H04L 63/1408; H04L 63/1441; H04L 63/145; H04L 67/00; H04L 67/10; H04L 67/1006; H04L 67/16; H04L 67/327; H04L 67/34; H04L 69/40; H04L 5/0005; H04L 5/14; H04L 5/26; H04L 5/006; H04L 5/0055; H04L 5/001; H04L 5/1469; H04B 7/2615; H04J 4/00; H04J 3/1694; H04J 3/22
See application file for complete search history.

(56) References Cited

OTHER PUBLICATIONS

Samsung, "R1-154136: Discussion on Category 4 LBT for UL transmission," 3GPP TSG RAN WG1 Meeting #82, Aug. 24-28, 2015, Beijing, China, 3 pages.
First Office Action for Chinese Patent Application No. 201780042333. 2, dated Dec. 27, 2021, 12 pages.
Author Unknown, "Technical Specification Group Radio Access Network; Evolved Universal Terrestrial Radio Acces (E-UTRA); Physical channelsand modulation (Release 13)," Technical Specification 36.211, Version 13.1.0, Mar. 2016, 3GPP Organizational Partners, 155 pages.
Author Unknown, "Technical Specification Group Radio Access Network; Evolved Universal Terrestrial Radio Acces (E-UTRA); Multiplexing and channel coding (Release 13)," Technical Specification 36.212, Version 13.1.0, Mar. 2016, 3GPP Organizational Partners, 129 pages.
Author Unknown, "Technical Specification Group Radio Access Network; Evolved Universal Terrestrial Radio Access (E-UTRA); Physical layer procedures (Release 13)," Technical Specification 36.213, Version 13.1.1, Mar. 2016, 3GPP Organizational Partners, 361 pages.
Ericsson, "R1-167723: On Contention Window Adjustment for Category 4 UL LBT", 3GPP TSG-RAN WG1 Meeting #86, Aug. 22-26, 2016, Gothenburg, Sweden, 6 pages.
Ericsson, "R1-156034: On CWS adjustment based on HARQ-ACK feedback,", 3GPP TSG RAN WG1 Meeting #82bis, Oct. 5-9, 2015, Malmo, Sweden, 9 pages.
Ericsson, "R1-165159: On Signaling of UL Channel Access Parameters", 3GPP TSG RAN WG1 Meeting #85, May 23-27, 2016, Nanjing, China, 6 pages.
Ericsson, "R1-165157: On UL Channel Access Procedures", 3GPP TSG RAN WG1 Meeting #85, May 23-27, 2016, Nanjing, China, 7 pages.
Huawei, et al., "R1-162129: Contention window size adjustment for UL category 4 LBT for eLAA," 3GPP TSG RAN WG1 Meeting #84bis, Apr. 11-15, 2016, Busan, Korea, 4 pages.
Nokia et al., "R1-162920: Channel Access for LAA UL," 3GPP TSG RAN WG1 Meeting #84bis, Apr. 11-15, 2016, Busan, South Korea, 9 pages.
Sharp, "R1-155566: LAA contention window size adjustment with HARQ-ACK," 3GPP TSG RAN WG1 Meeting #82bis, Oct. 5-9, 2015, Malmo, Sweden, 6 pages.
Non-Final Office Action for U.S. Appl. No. 16/099,272, dated May 22, 2020, 11 pages.
Final Office Action for U.S. Appl. No. 16/099,272, dated Nov. 24, 2020, 11 pages.
Examination Report for European Patent Application No. 17724118. 9, dated Jun. 16, 2020, 7 pages.
Invitation to Pay Additional Fees and Partial International Search for International Patent Application No. PCT/IB2017/052646, dated Aug. 8, 2017, 8 pages.
International Search Report and Written Opinion for International Patent Application No. PCT/IB2017/052646, dated Sep. 29, 2017, 12 pages.
Notice of Allowance for U.S. Appl. No. 16/099,272, dated Apr. 1, 2021, 8 pages.
Huawei, et al., "R1-160741: Other issues related to LBT for eLAA," 3GPP TSG RAN WG1 84 Meeting, Feb. 15-19, 2016, St. Julian's, Malta, 5 pages.
Extended European Search Report for European Patent Application No. 21193716.4, dated Oct. 11, 2021, 9 pages.

* cited by examiner

LBT PARAMETERS FOR UPLINK IN UNLICENSED SPECTRUM

This application is a continuation of U.S. patent application Ser. No. 16/099,272, filed Nov. 6, 2018, which is a 371 of International Application No. PCT/IB2017/052646, filed May 5, 2017, which claims the benefit of U.S. Provisional Application No. 62/332,846, filed May 6, 2016, the disclosures of which are fully incorporated herein by reference.

TECHNICAL FIELD

Particular embodiments are directed to wireless communications and, more particularly, to methods and apparatus for signaling and management of listen-before-talk (LBT) parameters for uplink transmission in unlicensed spectrum.

INTRODUCTION

The Third Generation Partnership Project (3GPP) initiative referred to as License Assisted Access (LAA) enables long term evolution (LTE) equipment to operate in the unlicensed 5 GHz radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

The standalone LTE-U forum and 3GPP Rel-14 work item on Uplink Licensed-Assisted Access (LAA) may specify that LTE user equipments (UEs) may transmit on the uplink in the unlicensed 5 GHz or license-shared 3.5 GHz radio spectrum. For the case of standalone LTE-U, all downlink and uplink transmissions take place entirely on the unlicensed spectrum.

Regulatory requirements may not permit transmissions in the unlicensed spectrum without prior channel sensing. This is because the unlicensed spectrum is shared with radios of similar or dissimilar wireless technologies. Wireless devices may perform channel sensing using a listen-before-talk (LBT) method. The LBT method includes sensing the transmission medium for a pre-defined minimum amount of time and backing off if the channel is busy.

Wi-Fi, LAA and Standalone LTE-U may operate in multicarrier mode with simultaneous transmission across multiple unlicensed channels in the 5 GHz band. Wi-Fi follows a hierarchical multi-carrier LBT scheme across multiple carriers which are selected using specific channel bonding rules.

For LAA and Standalone LTE-U, uplink transmissions are explicitly scheduled by the eNB, which has full control over when UEs are allowed to transmit. For carriers operating in unlicensed spectrum, however, UEs perform a form of LBT before transmitting on the carrier. The form of LBT may depend on the number of UEs that are scheduled, the number of subframes that are scheduled in succession, the length of the previous transmissions on the carrier, and/or other such factors. Some parameters related to LBT may be signaled by the eNB to UEs so that the UEs may perform LBT before transmission. The signaling parameters, however, do not fully encompass all the use cases and problems that may be encountered for uplink transmissions in unlicensed spectrum.

Particular embodiments described below include more signaling methods to solve these problems and address the new use cases. In addition, the particular embodiments describe signaling parameters that may be used to increase efficiency of LTE in unlicensed spectrum.

As background, LTE uses OFDM in the downlink and discrete Fourier transform (DFT)-spread OFDM (also referred to as single-carrier FDMA) in the uplink. The basic LTE downlink physical resource comprises a time-frequency grid as illustrated in FIG. 1.

FIG. 1 illustrates an example OFDM symbol. The horizontal axis represents time and the other axis represents frequency. Each resource element corresponds to one OFDM subcarrier during one OFDM symbol interval. An uplink subframe has the same subcarrier spacing as the downlink and the same number of SC-FDMA symbols in the time domain as OFDM symbols in the downlink. In the time domain, LTE downlink transmissions are organized into radio frames.

FIG. 2 illustrates an example radio frame. Each radio frame is 10 ms and consists of ten equally-sized subframes of length Tsubframe=1 ms. For normal cyclic prefix, one subframe consists of 14 OFDM symbols. The duration of each symbol is approximately 71.4 µs.

Resource allocation in LTE is typically described in terms of resource blocks, where a resource block corresponds to one slot (0.5 ms) in the time domain and 12 contiguous subcarriers in the frequency domain A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled. In each subframe a base station transmits control information about which terminals data is transmitted to and upon which resource blocks the data is transmitted in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information.

FIG. 3 illustrates an example downlink subframe. The subframe includes reference symbols and control signaling. In the illustrated example, the control region includes 3 OFDM symbols (i.e., CFI=3). The reference symbols include cell specific reference symbols (CRS), which may support multiple functions including fine time and frequency synchronization and channel estimation for certain transmission modes.

For LTE Rel-8 to Rel-10, a base station schedules downlink transmissions using a Physical Downlink Control Channel (PDCCH). From LTE Rel-11 and onwards, downlink transmissions may also be scheduled on an Enhanced Physical Downlink Control Channel (EPDCCH).

The PDCCH/EPDCCH carries downlink control information (DCI) such as scheduling decisions and power-control commands. For example, the DCI includes downlink scheduling assignments such as Physical Downlink Shared Channel (PDSCH) resource indication, transport format, hybrid-ARQ information, and control information related to spatial multiplexing (if applicable). A downlink scheduling assignment also includes a command for power control of the Physical Uplink Control Channel (PUCCH) used for transmission of hybrid-ARQ (HARQ) acknowledgements in response to downlink scheduling assignments. The DCI may also include uplink scheduling grants such as Physical Uplink Shared Channel (PUSCH) resource indication, transport format, and hybrid-ARQ-related information. An uplink scheduling grant also includes a command for power control of the PUSCH. The DCI may also include power control commands for a set of terminals as a complement to the commands included in the scheduling assignments/grants.

One PDCCH/EPDCCH carries one DCI message containing one of the groups of information listed above. Because a base station may schedule multiple terminals simultaneously, and each terminal may be scheduled on both downlink and uplink simultaneously, multiple scheduling messages may be transmitted within each subframe. Each scheduling message is transmitted on separate PDCCH/EPDCCH resources. Consequently, multiple simultaneous PDCCH/EPDCCH transmissions are typically within each subframe in each cell. Furthermore, support for different radio-channel conditions may use link adaptation. In link adaptation the code rate of the PDCCH/EPDCCH is selected by adapting the resource usage for the PDCCH/EPDCCH to match the radio-channel conditions.

In LTE, the eNB transmits the uplink transmission scheduling command to the UE. The LTE standard specifies a fixed delay between the time the scheduling command is transmitted and the time the UE transmits the uplink signal. This delay provides the UE time to decode the PDCCH/EPDCCH and prepare the uplink signal for transmission. For a frequency division duplex (FDD) serving cell, the uplink grant delay is 4 ms. For a time division duplex (TDD) serving cell, the uplink grant delay can be greater than 4 ms.

The LTE Rel-10 standard and above supports bandwidths larger than 20 MHz. One requirement of LTE Rel-10 is backward compatibility with LTE Rel-8. This includes spectrum compatibility. One way to provide compatibility is for an LTE Rel-10 carrier wider than 20 MHz to appear as a number of LTE carriers to an LTE Rel-8 terminal. Each such carrier may be referred to as a Component Carrier (CC).

For early LTE Rel-10 deployments, the number of LTE Rel-10-capable terminals will likely be smaller than the number of LTE legacy terminals already in existence. Thus, efficient use of a wide carrier is needed for legacy terminals, i.e. providing carriers where legacy terminals may be scheduled in all parts of the wideband LTE Rel-10 carrier. One solution uses carrier aggregation. Using carrier aggregation, an LTE Rel-10 terminal may receive multiple component carriers. The components carriers may have the same structure as a Rel-8 carrier.

FIG. 4 illustrates an example of carrier aggregation. A system bandwidth of 100 MHz may be represented by 5 component carriers each with 20 MHz bandwidth. A UE capable of carrier aggregation may be assigned a primary cell (PCell), which is always activated, and one or more secondary cells (SCells) which may be activated or deactivated dynamically.

The number of aggregated component carriers as well as the bandwidth of the individual component carriers may be different for uplink and downlink. A symmetric configuration refers to a configuration where the number of component carriers in downlink is the same as in uplink. An asymmetric configuration refers to a configuration where the number of component carriers is different between downlink and uplink. The number of component carriers configured in a cell may be different from the number of component carriers seen by a terminal. For example, a terminal may support more downlink component carriers than uplink component carriers, even though the cell is configured with the same number of uplink and downlink component carriers.

Another feature of carrier aggregation is the ability to perform cross-carrier scheduling. Cross-carrier scheduling enables a (E)PDCCH on one component carrier to schedule data transmissions on another component carrier using a 3-bit Carrier Indicator Field (CIF) inserted at the beginning of the (E)PDCCH messages. For data transmissions on a given component carrier, a UE expects to receive scheduling messages on the (E)PDCCH of just one component carrier (i.e., either the same component carrier, or a different component carrier via cross-carrier scheduling). The mapping from (E)PDCCH to PDSCH may be configured semi-statically.

Another wireless network technology that may share unlicensed spectrum with LTE is a wireless local area network (WLAN). Typical WLAN deployments use carrier sense multiple access with collision avoidance (CSMA/CA) for medium access. This means that the channel is sensed to perform a clear channel assessment (CCA), and a transmission is initiated only if the channel is determined to be idle. If the channel is determined to be busy, then the transmission is deferred until the channel is idle. When the range of several access points using the same frequency overlap, all transmissions related to one access point might be deferred when a transmission on the same frequency to or from another access point which is within range is detected. Effectively, if several access points are within range of each other, they will need to share the channel in time, and the throughput for the individual access points may be severely degraded. A general illustration of the listen-before-talk (LBT) mechanism on a single unlicensed channel is shown in FIG. 5.

FIG. 5 illustrates an example WLAN listen-before-talk mechanism. In the case of single-channel LBT, after a first Wi-Fi station transmits a data frame to a second Wi-Fi station, the second station transmits an ACK frame back to the first station with a delay of 16 µs. The ACK frame is transmitted by the second station without performing an LBT operation. To prevent another station interfering with the ACK frame transmission, a station defers for a duration of 34 µs (referred to as DIFS) after the channel is observed to be occupied before assessing again whether the channel is occupied.

Thus, a station that wishes to transmit first performs a clear channel assessment by sensing the medium for a fixed duration DIFS. If the medium is idle, then the station assumes that it may take ownership of the medium and begins a frame exchange sequence. If the medium is busy, the station waits for the medium to go idle, defers for DIFS, and waits for a further random backoff period. To further prevent a station from occupying the channel continuously and thereby preventing other stations from accessing the channel, after a successful transmission, a station performs a random backoff before transmitting again.

For multi-carrier operation, Wi-Fi uses a hierarchical channel bonding scheme to determine its transmission bandwidth for a frame, which could be 20 MHz, 40 MHz, 80 MHz, or 160 MHz, for example. In the 5 GHz band, wider Wi-Fi channel widths of 40 MHz, 80 MHz, 160 MHz or 80+80 MHz are formed by combining 20 MHz sub-channels in a non-overlapping manner A pre-determined primary channel performs the contention window-based random access procedure after a defer period, if necessary, and then counts down the random number generated. The secondary channels perform a quick CCA check for a PIFS duration (generally 25 µs) before the potential start of transmission to determine if the additional secondary channels are available for transmission. Based on the results of the secondary CCA check, transmission is performed on the larger bandwidths; otherwise transmission falls back to smaller bandwidths. The Wi-Fi primary channel is always included in all transmissions (i.e., transmission on secondary channels alone is not allowed).

LTE has traditionally used dedicated frequency spectrum. An advantage of dedicated spectrum is that an LTE system does not need to coexist with other non-3GPP radio access technologies in the same spectrum, which can maximize spectrum efficiency. The spectrum allocated to LTE, however, is limited. It may not meet the ever increasing demand for larger throughput from applications/services. Therefore, 3GPP also specifies how LTE may use unlicensed spectrum in addition to licensed spectrum. In addition, Standalone LTE-U is under development by the MulteFire Alliance, in which LTE operates solely in unlicensed spectrum.

FIG. 6 illustrates a user equipment with license assisted access to unlicensed spectrum. In license assisted access, a UE is connected to a PCell in the licensed band and one or more SCells in the unlicensed band. A secondary cell in unlicensed spectrum may be referred to as a LAA secondary cell (LAA SCell). The LAA SCell may operate in downlink-only mode or operate with both uplink and downlink traffic. In some scenarios, LTE nodes may operate in standalone mode in license-exempt channels without assistance from a licensed cell.

Unlicensed spectrum can, by definition, be used simultaneously by multiple different technologies. Therefore, LAA must coexist and cooperate with other systems, such as IEEE 802.11 (Wi-Fi). To coexist fairly with a Wi-Fi system, transmission on the SCell conforms to LBT protocols to avoid collisions which may cause severe interference to on-going transmissions. This includes both performing LBT before commencing transmissions, and limiting the maximum duration of a single transmission burst. The maximum transmission burst duration is specified by country and region-specific regulations (e.g., 4 ms in Japan and 13 ms according to EN 301.893). An example is illustrated in FIG. 7.

FIG. 7 illustrates an example of uplink license assisted access transmissions based on an uplink listen-before-talk protocol. The example illustrates a duration of a transmission burst on an LAA SCell constrained by a maximum allowed transmission duration of 4 ms. For example, the illustration divides an 8 ms occupancy time into 4 ms for downlink channel occupancy and 4 ms for uplink channel occupancy.

Before the eNB transmits data in the downlink, it performs LBT to gain channel access. During the eNB's transmission duration, it also sends out control channels to schedule certain UEs to transmit in the uplink at specific time later. After the eNB releases the channel, the scheduled UEs perform LBT to determine whether they can transmit in the channel at said specific time. For example, after receiving a downlink transmission in subframes n−4 to n−1 (i.e., 4 ms), the UE performs a clear channel access for the uplink at subframe n. If the channel is clear, the UE transmits in uplink for subframes n to n+3 (i.e., 4 ms).

When an eNB obtains an opportunity to transmit in unlicensed spectrum, the opportunity (also referred to as a transmit opportunity (TXOP)), may be shared with UEs that the eNB is serving. Transitions between transmissions from the eNB to transmissions from UEs may be handled in two ways, one where the UEs perform an LBT operation prior to transmission and one where the UEs do not perform an LBT operation.

The case where an LBT operation is not performed will most likely need the gap between downlink transmissions (from the eNB) and uplink transmissions (from the UE(s)) to be no more than 16 µs. When an LBT operation is to be performed for a particular subframe, gaps will need to be inserted in the uplink subframes to allow for the UE to perform a listen-before-talk operation without being interfered by transmissions from other UEs in the same serving cell. To avoid significantly degrading uplink throughput, the gaps should not be too large. Therefore, the gap in an uplink subframe of 14 DFT spread OFDM (DFTS-OFDM) symbols is likely to not be larger than one DFTS-OFDM symbol, which is approximately 71 microseconds in duration.

Performing LBT may generally include two broad categories of LBT operation. A first type uses an LBT procedure with full random backoff similar to what is used by IEEE 802.11 compliant nodes. These schemes are also referred to as Category 4 LBT schemes.

In these schemes a random backoff counter is drawn uniformly randomly in the interval {0, CW}, where CW is the contention window. The size of the contention window may be approximately doubled every time a collision on the channel is detected. Thus, this procedure may also be referred to as a binary exponential backoff.

The contention window size is limited by a minimum value, CWmin, and a maximum value, CWmax. The values of CWmin and CWmax may vary depending on the priority class of the traffic. For the highest priority class, the {CWmin, CWmax} values may be limited to {3, 7} where these numbers are counted in increments of one slot which has a duration of 9 microseconds as shown in FIG. 5. There are four defined priority classes. The remaining three priority classes use contention window size pairs of {7, 15}, {15, 63} and {15, 1023}, respectively, for an access point (AP) or an eNB. For Wi-Fi STAs or UEs in LTE, the values of {15, 63} are not used.

In the second type of LBT procedure, a UE may perform an LBT operation for a fixed duration (e.g., 25 µs). Generally, the second type of LBT is preferable for transitions between downlink and uplink transmissions, because it minimizes the probability of another node completing its LBT operations and commencing transmissions on the channel. Many situations, however, may need to use a Category 4 LBT scheme.

One technique to minimize gaps between downlink and uplink transmissions is to use a timing advance command to advance the timing of the UEs transmissions on the uplink so that they occur earlier. This technique may be used where the eNB may employ transmissions only over a part of the subframe in the last downlink subframe of a transmission burst. In this case, there is a gap within the downlink subframe that can be occupied by uplink transmissions by UEs that have received timing advance (TA) commands.

The use of LTE carrier aggregation (CA), introduced in Rel-10, may increase the peak data rate, system capacity, and user experience by aggregating radio resources from multiple carriers that may reside in the same band or different bands. Rel-13 LAA and Standalone LTE-U offer an ability to operate on multiple carriers in unlicensed spectrum simultaneously. The extension of the CA framework beyond 5 carriers was completed in LTE Rel-13, which supports up to 32 carriers in both uplink and downlink.

3GPP specifications may include multi-subframe scheduling for Rel-14 LAA where one or more uplink grants transmitted in a single subframe can schedule uplink data in multiple subframes. The parameters that are signaled as part of the multi-subframe scheduling grant include hybrid ARQ acknowledgements (HARQ-ACKs) and related parameters. Specifically, the grants include legacy parameters (i.e., the new data indication (NDI), redundancy version (RV), and the HARQ-ACK bits themselves, which generally consist of one bit per transport block that is being acknowledged).

Signaling of LBT parameters for LAA may use both explicit and implicit methods. The solutions include signaling of random backoff parameters such as the random backoff counter, contention window sizes, and the LBT priority class to be used. The signaling of these parameters may vary depending on factors such as the load and the set of UEs being multiplexed in a single subframe. Implicit signaling of the LBT priority class to be used can be based on various factors including the number of contiguous subframes that have been scheduled to the UE. The contention window sizes to be used at the UE can also be implicitly signaled by indicating whether the transmission is a new transmission or a retransmission.

Existing signaling and contention window management methods, however, do not fully account for the problems that arise when using implicit signaling to indicate contention window size that the UE must use. When explicit signaling is used, it creates unnecessarily large signaling overhead.

SUMMARY

The embodiments described herein include efficiently signaling listen-before-talk (LBT) parameters for a Category 4 LBT scheme to a user equipment (UE), while ensuring that requirements on management of contention windows are met. Particular embodiments facilitate the management of uplink transmissions in unlicensed spectrum by varying the gaps between transmissions by different nodes. Signaling to enable the functionality is disclosed. The disclosure includes the following general solutions for managing the contention window size of a Category 4 LBT scheme used by a UE in a particular uplink subframe.

Particular embodiments include implicit signaling with contention window management at the UE. The contention window size may be managed using the NDI bit for the HARQ process in the currently scheduled burst corresponding to a previously transmitted reference subframe or subframes.

According to some embodiments, a method for use in a user equipment (UE) of managing a listen-before-talk (LBT) contention window size comprises receiving scheduling for a current burst of contiguous uplink subframes. The scheduling comprises, for each subframe of the burst of contiguous uplink subframes, an associated hybrid automatic repeat request (HARQ) process identifier and an associated new data indicator (NDI). The method further comprises determining a reference subframe based on a previously-scheduled burst of contiguous uplink subframes. The reference subframe is associated with a reference HARQ process identifier. When the UE determines the HARQ process identifier associated with at least one of the subframes of the current scheduled burst of contiguous uplink subframes matches the reference HARQ process identifier and the associated NDI indicates new data, the method resets the LBT contention window size to a minimum value. When the UE determines the HARQ process identifier associated with at least one of the subframes of the current scheduled burst of contiguous uplink subframes matches the reference HARQ process identifier and the associated NDI indicates a retransmission, or when the UE determines none of the HARQ process identifiers associated with the current scheduled burst of contiguous uplink subframes matches the reference HARQ process identifier, the method increments the LBT contention window size. The method further comprises performing an LBT procedure for the current scheduled burst of contiguous uplink subframes using the contention window size.

In particular embodiments, determining the reference subframe comprises determining the most recent previously-scheduled burst of contiguous uplink subframes for which the associated HARQ process identifier is also found in the received scheduling for the current scheduled burst of contiguous uplink subframes. Determining the reference subframe may comprise determining the most recent previously-scheduled burst of contiguous uplink subframes for which the HARQ process identifier associated with the first subframe of the previously-scheduled burst of contiguous uplink subframes is also found in the received scheduling for the current scheduled burst of contiguous uplink subframes. Determining the reference subframe may comprise determining the first uplink subframe transmitted at least a threshold time (e.g., 4 ms) prior to receiving the scheduling for the current scheduled burst of contiguous uplink subframes.

In particular embodiments, resetting the LBT contention window size to a minimum value comprises resetting the LBT contention window size to a minimum value of a set of values associated with a priority class used by the UE to perform LBT prior to receiving the scheduling for the current scheduled burst of contiguous uplink subframes. Incrementing the LBT contention window size may comprise incrementing the LBT contention window size to a next value in a set of values associated with a priority class used by the UE to perform LBT prior to the determined reference subframe.

In particular embodiments, performing the LBT procedure for the current scheduled burst of contiguous uplink subframes comprises performing a category 4 LBT for physical uplink shared channel (PUSCH) transmission on a licensed assisted access (LAA) secondary cell.

In particular embodiments, the method further comprises determining the LBT contention window size has been incremented a threshold number of times, and resetting the LBT contention window size to the minimum value.

According to some embodiments, a UE capable of managing an LBT contention window size comprises processing circuitry operable to receive scheduling for a current burst of contiguous uplink subframes. The scheduling comprises, for each subframe of the burst of contiguous uplink subframes, an associated HARQ process identifier and an associated NDI. The processing circuitry further determines a reference subframe based on a previously-scheduled burst of contiguous uplink subframes. The reference subframe is associated with a reference HARQ process identifier. When the UE determines the HARQ process identifier associated with at least one of the subframes of the current scheduled burst of contiguous uplink subframes matches the reference HARQ process identifier and the associated NDI indicates new data, the processing circuitry resets the LBT contention window size to a minimum value. When the UE determines the HARQ process identifier associated with at least one of the subframes of the current scheduled burst of contiguous uplink subframes matches the reference HARQ process identifier and the associated NDI indicates a retransmission, or when the UE determines none of the HARQ process identifiers associated with the current scheduled burst of contiguous uplink subframes matches the reference HARQ process identifier, the processing circuitry increments the LBT contention window size. The processing circuitry is further operable to perform an LBT procedure for the current scheduled burst of contiguous uplink subframes using the contention window size.

According to some embodiments, a UE capable of managing an LBT contention window size comprises a receiving module, a determining module, and an LBT module. The receiving module is operable to receive scheduling for a current burst of contiguous uplink subframes. The scheduling comprises, for each subframe of the burst of contiguous uplink subframes, an associated HARQ process identifier and an associated NDI. The determining module is operable to determine a reference subframe based on a previously-scheduled burst of contiguous uplink subframes. The reference subframe is associated with a reference HARQ process identifier. When the UE determines the HARQ process identifier associated with at least one of the subframes of the current scheduled burst of contiguous uplink subframes matches the reference HARQ process identifier and the associated NDI indicates new data, the LBT module is operable to reset the LBT contention window size to a minimum value. When the UE determines the HARQ process identifier associated with at least one of the subframes of the current scheduled burst of contiguous uplink subframes matches the reference HARQ process identifier and the associated NDI indicates a retransmission, or when the UE determines none of the HARQ process identifiers associated with the current scheduled burst of contiguous uplink subframes matches the reference HARQ process identifier, the LBT module is operable to increment the LBT contention window size. The LBT module is further operable to perform an LBT procedure for the current scheduled burst of contiguous uplink subframes using the contention window size.

Also disclosed is a computer program product. The computer program product comprises instructions stored on non-transient computer-readable media which, when executed by a processor, perform the act of receiving scheduling for a current burst of contiguous uplink subframes. The scheduling comprises, for each subframe of the burst of contiguous uplink subframes, an associated hybrid automatic repeat request (HARQ) process identifier and an associated new data indicator (NDI). The instructions are further operable to perform the act of determining a reference subframe based on a previously-scheduled burst of contiguous uplink subframes. The reference subframe is associated with a reference HARQ process identifier. When the UE determines the HARQ process identifier associated with at least one of the subframes of the current scheduled burst of contiguous uplink subframes matches the reference HARQ process identifier and the associated NDI indicates new data, the instructions are further operable to perform the act of resetting the LBT contention window size to a minimum value. When the UE determines the HARQ process identifier associated with at least one of the subframes of the current scheduled burst of contiguous uplink subframes matches the reference HARQ process identifier and the associated NDI indicates a retransmission, or when the UE determines none of the HARQ process identifiers associated with the current scheduled burst of contiguous uplink subframes matches the reference HARQ process identifier, the instructions are further operable to perform the act of incrementing the LBT contention window size. The instructions are further operable to perform the act of performing an LBT procedure for the current scheduled burst of contiguous uplink subframes using the contention window size.

Particular embodiments include signaling of different information using a single LBT priority field depending on the signaled LBT type.

According to some embodiments, a method for use in a UE comprises receiving, from a network node, an LBT type and an LBT priority class. When the received LBT type indicates that the UE should perform a fixed duration clear channel assessment (CCA), the method comprises transmitting uplink data with a quality of service type based on the received LBT priority class. The received LBT priority class refers to the priority class that the network node used to obtain downlink channel access to send the LBT type and the LBT priority class. When the received LBT type indicates that the UE should perform an LBT procedure with random backoff, the method comprises performing the LBT procedure with random backoff according to the received LBT priority class.

In particular embodiments, the LBT type and LBT priority class are received in an uplink grant. The LBT procedure with random backoff may comprise a category 4 LBT for physical uplink shared channel (PUSCH) transmission on a licensed assisted access (LAA) secondary cell. When the received LBT type indicates that the UE should perform an LBT procedure with random backoff, the method may further comprise transmitting uplink data with a quality of service type independent of the received LBT priority class.

According to some embodiments, a UE comprises processing circuitry operable to receive, from a network node, a listen-before-talk (LBT) type and an LBT priority class. When the received LBT type indicates that the UE should perform a fixed duration clear channel assessment (CCA), the processing circuitry transmits uplink data with a quality of service type based on the received LBT priority class. The received LBT priority class refers to the priority class that the network node used to obtain downlink channel access to send the LBT type and the LBT priority class. When the received LBT type indicates that the UE should perform an LBT procedure with random backoff, the processing circuitry performs the LBT procedure with random backoff according to the received LBT priority class.

According to some embodiments, a UE comprises a receiving module, a transmitting module, and an LBT module. The receiving module is operable to receive, from a network node, an LBT type and an LBT priority class. When the received LBT type indicates that the UE should perform a fixed duration clear channel assessment (CCA), the transmitting module transmits uplink data with a quality of service type based on the received LBT priority class. The received LBT priority class refers to the priority class that the network node used to obtain downlink channel access to send the LBT type and the LBT priority class. When the received LBT type indicates that the UE should perform an LBT procedure with random backoff, the LBT module performs the LBT procedure with random backoff according to the received LBT priority class.

Also disclosed is a computer program product. The computer program product comprises instructions stored on non-transient computer-readable media which, when executed by a processor, perform the act of receiving, from a network node, an LBT type and an LBT priority class. When the received LBT type indicates that the UE should perform a fixed duration clear channel assessment (CCA), the instructions are further operable to perform the act of transmitting uplink data with a quality of service type based on the received LBT priority class. The received LBT priority class refers to the priority class that the network node used to obtain downlink channel access to send the LBT type and the LBT priority class. When the received LBT type indicates that the UE should perform an LBT procedure with random backoff, the instructions are further operable to perform the act of performing the LBT procedure with random backoff according to the received LBT priority class.

Particular embodiments include explicit signaling with contention window management done by the eNB. A single bit may be used to indicate an increase or a decrease in contention window size.

According to some embodiments, a method for use in a network node of signaling LBT parameters comprises determining a UE should increase or decrease a contention window size used for performing an LBT procedure, and sending a contention window size to the UE.

In particular embodiments, sending the contention window size to the UE comprises sending a single bit to the UE. A first value of the single bit instructs the UE to increment the contention window size used for performing the LBT procedure, and a second value of the single bit instructs the UE to reset the contention window size used for performing the LBT procedure to a minimum value. Sending the contention window size to the UE may comprise sending multiple bits to the UE. The multiple bits represent a particular contention window size of the possible contention window sizes across all LBT priority classes.

According to some embodiments, a network node operable to signal LBT parameters comprises processing circuitry operable to determine a UE should increase or decrease a contention window size used for performing an LBT procedure, and send a contention window size to the UE.

According to some embodiments, a network node operable to signal LBT parameters comprises a determining module and a sending module. The determining module is operable to determine a UE should increase or decrease a contention window size used for performing an LBT procedure. The sending module is operable to send a contention window size to the UE.

Also disclosed is a computer program product. The computer program product comprises instructions stored on non-transient computer-readable media which, when executed by a processor, perform the acts of determining a UE should increase or decrease a contention window size used for performing an LBT procedure, and sending a contention window size to the UE.

Particular embodiments may exhibit some of the following technical advantages. For example, particular embodiments may improve uplink and/or system performance by reducing the amount of signaling, which may reduce network load and device complexity. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
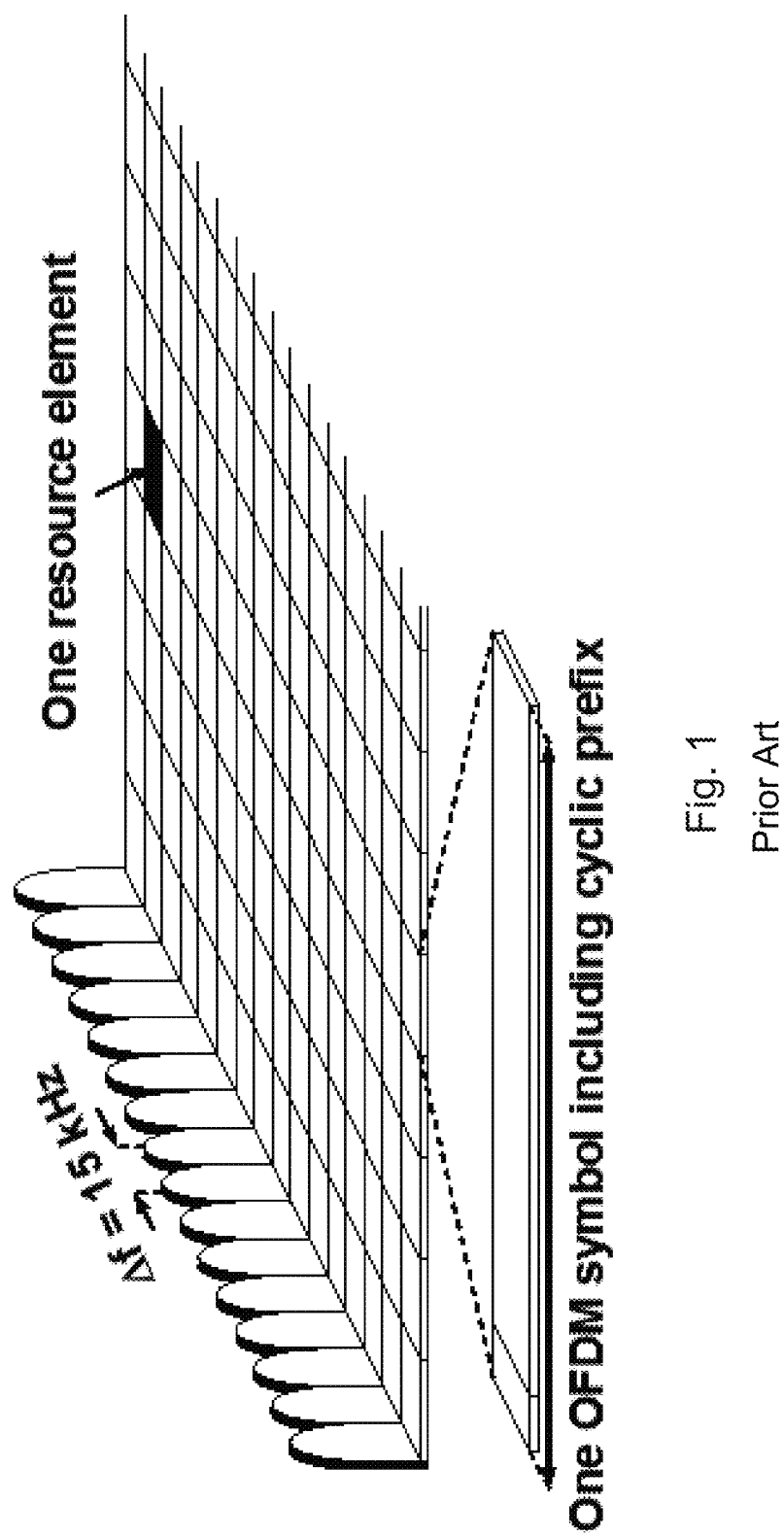
FIG. 1 illustrates an example OFDM symbol.

Long term evolution (LTE) equipment may operate in the unlicensed 5 GHz radio spectrum according to the Third Generation Partnership Project (3GPP) initiative referred to as License Assisted Access (LAA). The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell).

Regulatory requirements may not permit transmissions in the unlicensed spectrum without prior channel sensing. This is because the unlicensed spectrum is shared with radios of similar or dissimilar wireless technologies. Wireless devices may perform channel sensing using a listen-before-talk (LBT) method. The LBT method includes sensing the transmission The form of LBT may depend on the number of UEs that are scheduled, the number of subframes that are scheduled in succession, the length of the previous transmissions on the carrier, and/or other such factors. Some parameters related to LBT may be signaled by the eNB to UEs so that the UEs may perform LBT before transmission. The signaling parameters, however, do not fully encompass all the use cases and problems that may be encountered for uplink transmissions in unlicensed spectrum.

In license assisted access, a UE is connected to a PCell in the licensed band and one or more SCells in the unlicensed band. The LAA SCell may operate in downlink-only mode or operate with both uplink and downlink traffic. In some scenarios, LTE nodes may operate in standalone mode in license-exempt channels without assistance from a licensed cell.

Unlicensed spectrum may be used simultaneously by multiple different technologies. Therefore, LAA must coexist and cooperate with other systems, such as IEEE 802.11 (Wi-Fi). To coexist fairly with a Wi-Fi system, transmission on the SCell conforms to LBT protocols to avoid collisions which may cause severe interference to on-going transmissions. This includes both performing LBT before commencing transmissions, and limiting the maximum duration of a single transmission burst. The maximum transmission burst duration is specified by country and region-specific regulations (e.g., 4 ms in Japan and 13 ms according to EN 301.893).

Before an eNB transmits data in the downlink, it performs LBT to gain channel access. During the eNB's transmission duration, it also sends out control channels to schedule certain UEs to transmit in the uplink at specific time later. After the eNB releases the channel, the scheduled UEs perform LBT to determine whether they can transmit in the channel at said specific time. For example, after receiving a downlink transmission in subframes n−4 to n−1 (i.e., 4 ms), the UE performs a clear channel access for the uplink at subframe n. If the channel is clear, the UE transmits in uplink for subframes n to n+3 (i.e., 4 ms).

When an eNB obtains an opportunity to transmit in unlicensed spectrum, the transmit opportunity may be shared with UEs that the eNB is serving. Transitions between transmissions from the eNB to transmissions from UEs may be handled in two ways, one where the UEs perform an LBT operation prior to transmission and one where the UEs do not perform an LBT operation.

Performing LBT may generally include two broad categories of LBT operation. A first type uses an LBT procedure with full random backoff similar to what is used by IEEE 802.11 compliant nodes. These schemes are also referred to as Category 4 LBT schemes.

In these schemes a random backoff counter is drawn uniformly randomly in the interval {0, CW}, where CW is the contention window. The size of the contention window may be approximately doubled every time a collision on the channel is detected. Thus, this procedure may also be referred to as a binary exponential backoff.

The contention window size is limited by a minimum value, CWmin, and a maximum value, CWmax. The values of CWmin and CWmax may vary depending on the priority class of the traffic.

In the second type of LBT procedure, a UE may perform an LBT operation for a fixed duration (e.g., 25 μs). Generally, the second type of LBT is preferable for transitions between downlink and uplink transmissions, because it minimizes the probability of another node completing its LBT operations and commencing transmissions on the channel. Many situations, however, may need to use a Category 4 LBT scheme.

One technique to minimize gaps between downlink and uplink transmissions is to use a timing advance command to advance the timing of the UEs transmissions on the uplink so that they occur earlier. This technique may be used where the eNB may employ transmissions only over a part of the subframe in the last downlink subframe of a transmission burst. In this case, there is a gap within the downlink subframe that can be occupied by uplink transmissions by UEs that have received timing advance (TA) commands.

3GPP specifications may include multi-subframe scheduling for Rel-14 LAA where one or more uplink grants transmitted in a single subframe can schedule uplink data in multiple subframes. The parameters that are signaled as part of the multi-subframe scheduling grant include hybrid ARQ acknowledgements (HARQ-ACKs) and related parameters. Specifically, the grants include legacy parameters (i.e., the new data indication (NDI), redundancy version (RV), and the HARQ-ACK bits themselves, which generally consist of one bit per transport block that is being acknowledged).

Signaling of LBT parameters for LAA may use both explicit and implicit methods. The solutions include signaling of random backoff parameters such as the random backoff counter, contention window sizes, and the LBT priority class to be used. The signaling of these parameters may vary depending on factors such as the load and the set of UEs being multiplexed in a single subframe. Implicit signaling of the LBT priority class to be used can be based on various factors including the number of contiguous subframes that have been scheduled to the UE. The contention window sizes to be used at the UE can also be implicitly signaled by indicating whether the transmission is a new transmission or a retransmission.

Existing signaling and contention window management methods, however, do not fully account for the problems that arise when using implicit signaling to indicate contention window size that the UE must use. When explicit signaling is used, it creates unnecessarily large signaling overhead.

Particular embodiments obviate the problems described above and include signaling LBT parameters for a Category 4 LBT scheme to a UE more efficiently, while ensuring that requirements on management of contention windows are met. Particular embodiments facilitate the management of uplink transmissions in unlicensed spectrum by providing the ability to vary the gaps between transmissions by different nodes. Some embodiments include signaling to enable the functionality. The following general embodiments for managing the contention window size of a Category 4 LBT scheme used by a UE in a particular uplink subframe are described.

Some embodiments include implicit signaling with contention window management at the UE. For example, particular embodiments use a new data indicator (NDI) bit for the hybrid automatic repeat request (HARQ) process in the currently scheduled burst which was the HARQ process number corresponding to the first subframe of the previously scheduled burst for the UE.

Some embodiments use explicit signaling with contention window management done by the eNB. For example, some embodiments use a single bit to indicate an increase or a decrease in contention window size. Some embodiments use signaling of different information using a single LBT priority field depending on the signaled LBT type. Particular embodiments may improve uplink and/or system performance by reducing the amount of signaling, which may reduce network load and device complexity.

The embodiments described herein are applicable to both LAA LTE and standalone LTE-U operation, and in general for any system such as LTE operating in unlicensed spectrum or any spectrum where listen-before-talk protocols are used and where there is some fixed timing where transmissions occur.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 8-14B of the drawings, like numerals being used for like and corresponding parts of the various drawings. LTE is used throughout this disclosure as an example cellular system, but the ideas presented herein may apply to other wireless communication systems as well.

Figure 8:
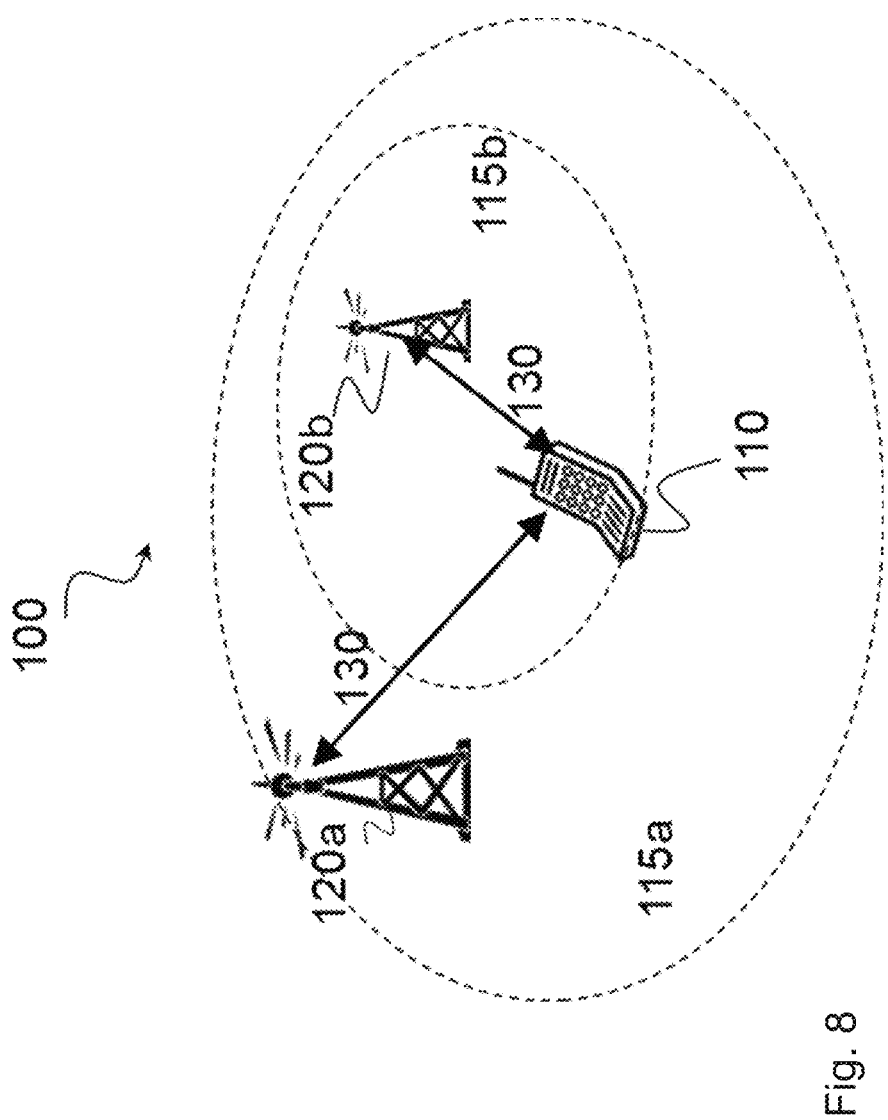
FIG. 8 is a block diagram illustrating an example wireless network, according to some embodiments.

FIG. 8 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Figure 2:
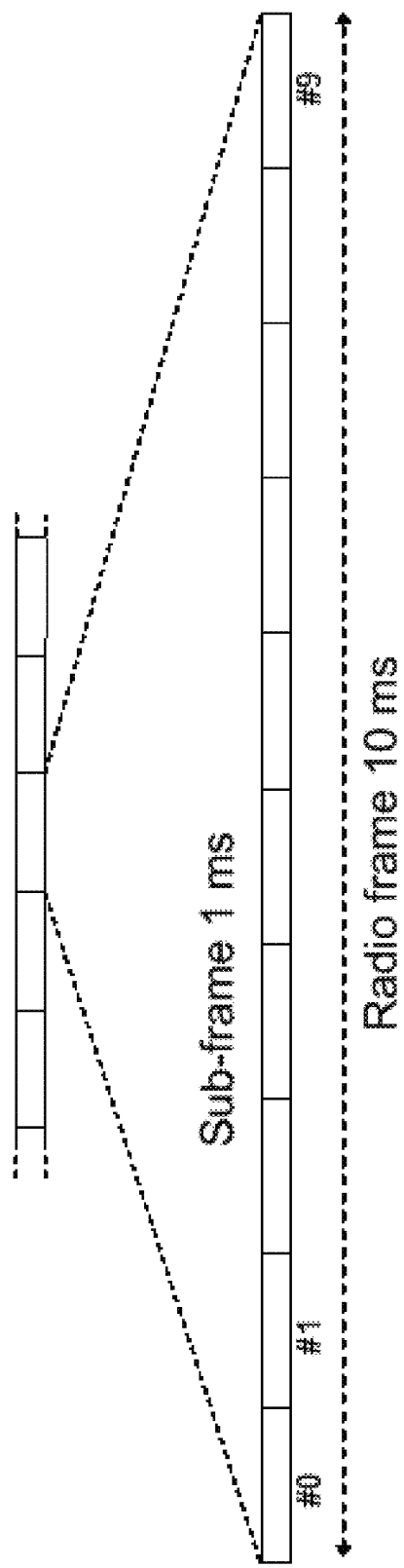
FIG. 2 illustrates an example radio frame.
Figure 3:
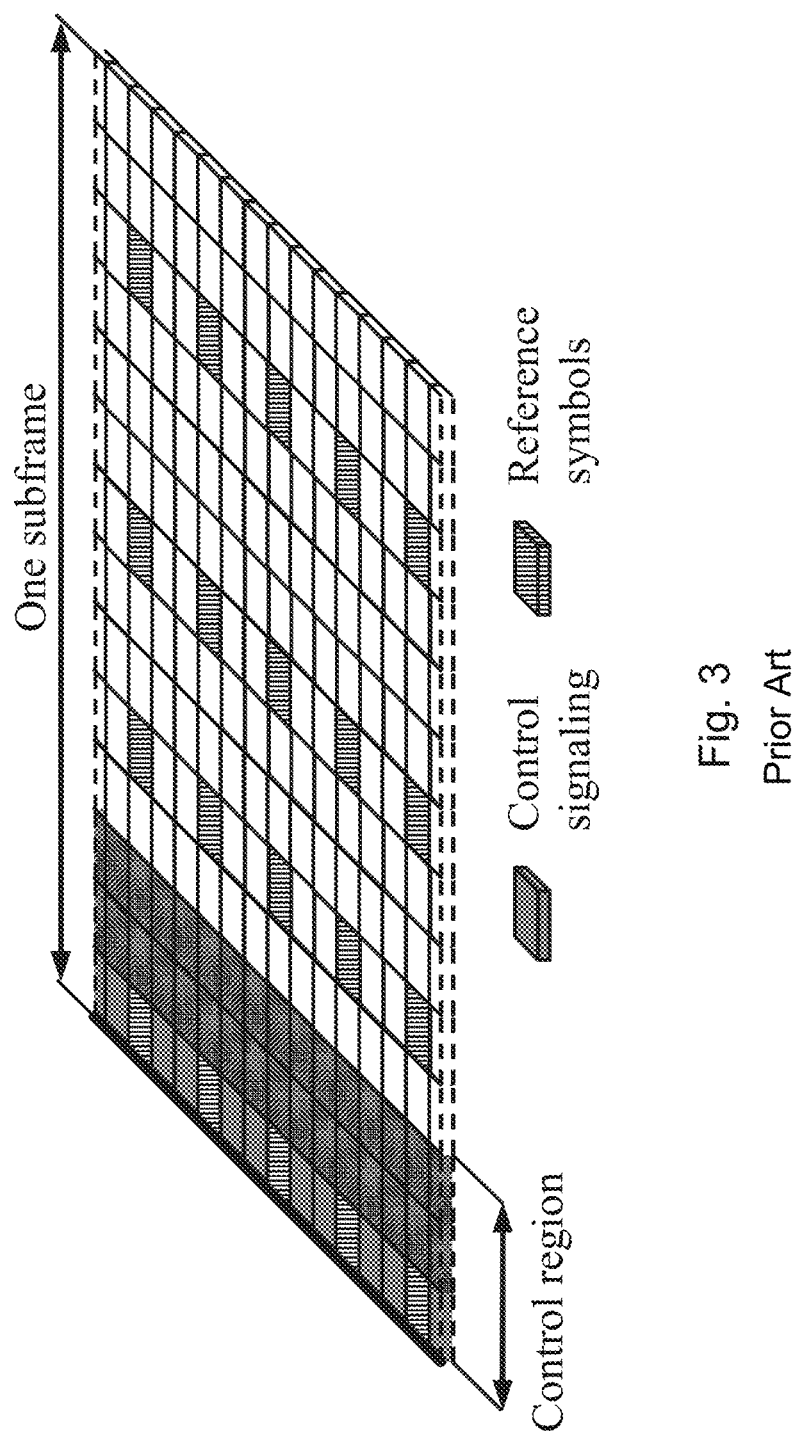
FIG. 3 illustrates an example downlink subframe.
Figure 4:
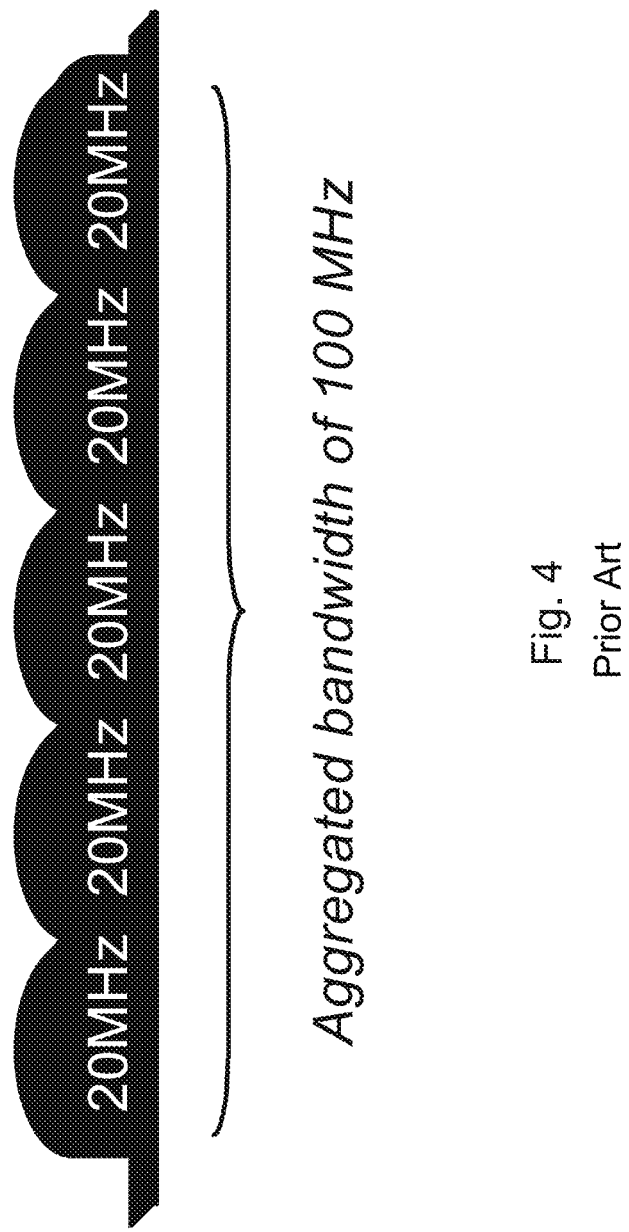
FIG. 4 illustrates an example of carrier aggregation.
Figure 5:
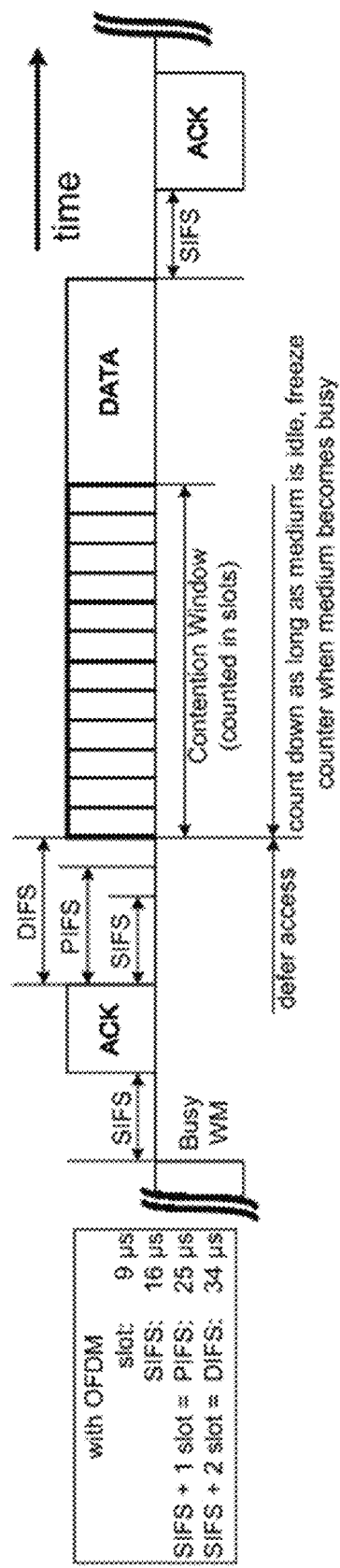
FIG. 5 illustrates an example WLAN listen-before-talk mechanism.
Figure 6:
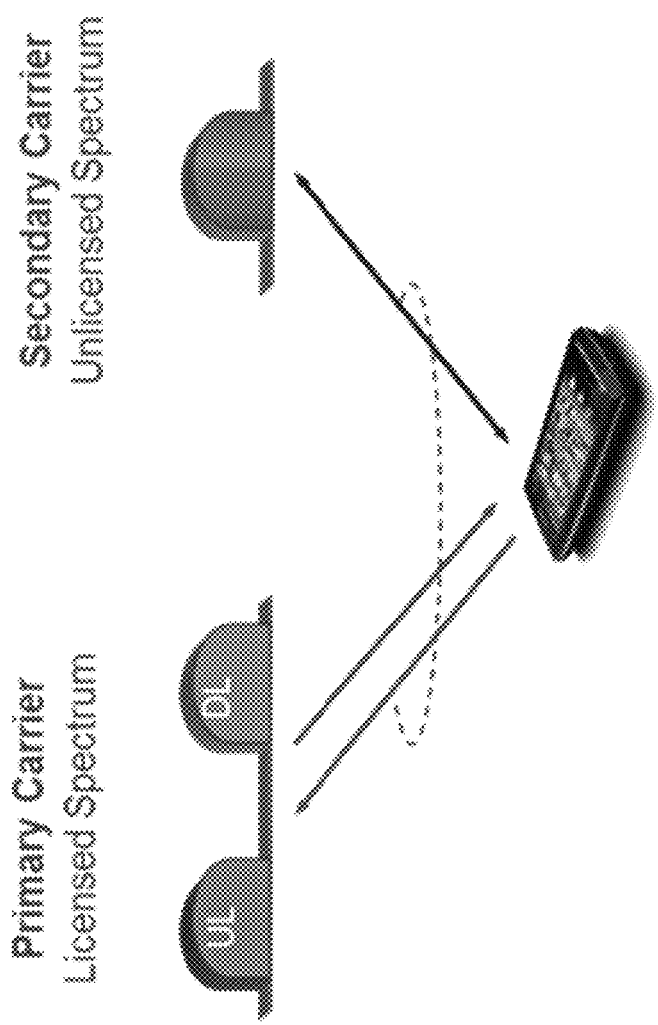
FIG. 6 illustrates a user equipment with license assisted access to unlicensed spectrum.
Figure 7:
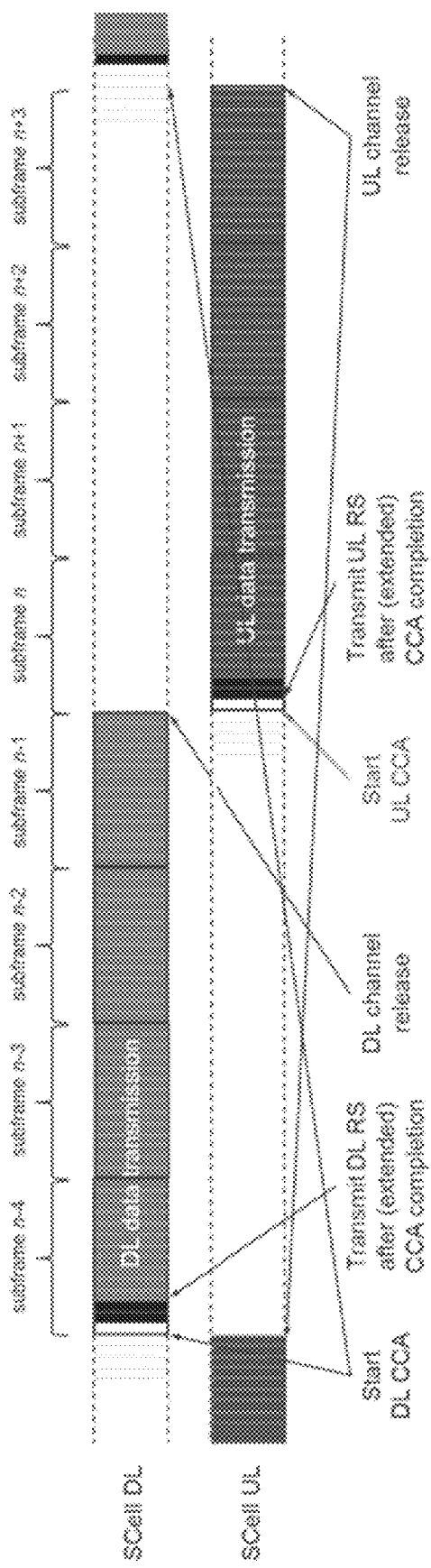
FIG. 7 illustrates an example of uplink license assisted access transmissions based on an uplink listen-before-talk protocol.

Wireless signals 130 may include frames and subframes, such as those described with respect to FIGS. 1-3. Network node 120 may dynamically schedule subframes as an uplink subframe, a downlink subframe, or a combination uplink and downlink subframe.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In particular embodiments, network node 120a may dynamically schedule uplink and downlink subframes for wireless device 110. For example, in particular embodiments network node 120a may determine a first uplink/downlink scheduling pattern for a first plurality of consecutive subframes. Network node 120a may transmit the first uplink/downlink scheduling pattern to wireless device 110 (e.g., using (E)PDCCH) and transmit at least one subframe to wireless device 110 according to the first uplink/downlink scheduling pattern.

If network node 120a received additional downlink data, or a request for uplink transmission from a wireless device, for example, then network node 120a may determine a second uplink/downlink scheduling pattern for a second plurality of consecutive subframes. Network node 120a may transmit the second uplink/downlink scheduling pattern to wireless device 110 in any of the subframes previously scheduled for wireless device 110.

In particular embodiments, the uplink/downlink scheduling pattern may comprise a number of subsequent downlink subframes, a number of subsequent downlink and uplink subframes, an indication of which subframes to monitor or not monitor for downlink, or any other suitable pattern.

In particular embodiments, wireless device 110 may receive, from network node 120 (e.g., using (E)PDCCH), a first uplink/downlink scheduling pattern for a first plurality of consecutive subframes. Wireless device 110 may receive at least one subframe according to the first uplink/downlink scheduling pattern. In one of the scheduled downlink subframes, wireless device 110 may receive a second uplink/downlink scheduling pattern for a second plurality of consecutive subframes.

Wireless device 110 may perform LBT procedures before transmitting in the uplink. In some embodiments, network node 120 may signal an LBT contention window size to wireless device 110. For example, wireless device 110 may receive scheduling for a current burst of contiguous uplink subframes. The scheduling comprises, for each subframe of the burst of contiguous uplink subframes, an associated HARQ process identifier and an associated new data indicator (NDI). Wireless device 110 determines a reference subframe based on a previously-scheduled burst of contiguous uplink subframes. The reference subframe is associated with a reference HARQ process identifier.

When wireless device 110 determines that the HARQ process identifier associated with at least one of the subframes of the current scheduled burst of contiguous uplink subframes matches the reference HARQ process identifier and the associated NDI indicates new data, wireless device 110 resets the LBT contention window size to a minimum value. When wireless device 110 determines that the HARQ process identifier associated with at least one of the subframes of the current scheduled burst of contiguous uplink subframes matches the reference HARQ process identifier and the associated NDI indicates a retransmission, or when wireless device 110 determines none of the HARQ process identifiers associated with the current scheduled burst of contiguous uplink subframes match the reference HARQ process identifier, wireless device 110 increments the LBT contention window size. Wireless device 110 performs an LBT procedure for the current scheduled burst of contiguous uplink subframes using the contention window size.

In particular embodiments, wireless device 110 may determine the most recent previously-scheduled burst of contiguous uplink subframes for which the associated HARQ process identifier is also found in the received scheduling for the current scheduled burst of contiguous uplink subframes. Determining the reference subframe may comprise determining the most recent previously-scheduled burst of contiguous uplink subframes for which the HARQ process identifier associated with the first subframe of the previously-scheduled burst of contiguous uplink subframes is also found in the received scheduling for the current scheduled burst of contiguous uplink subframes. Determining the reference subframe may comprise determining the first uplink subframe transmitted at least a threshold time (e.g., 4 ms) prior to receiving the scheduling for the current scheduled burst of contiguous uplink subframes.

In particular embodiments, resetting the LBT contention window size to a minimum value comprises resetting the LBT contention window size to a minimum value of a set of values associated with a priority class used by the UE to perform LBT prior to receiving the scheduling for the current scheduled burst of contiguous uplink subframes. Incrementing the LBT contention window size may comprise incrementing the LBT contention window size to a next value in a set of values associated with a priority class used by the UE to perform LBT prior to the determined reference subframe.

In particular embodiments, performing the LBT procedure for the current scheduled burst of contiguous uplink subframes comprises performing a category 4 LBT for physical uplink shared channel (PUSCH) transmission on a licensed assisted access (LAA) secondary cell.

In particular embodiments, wireless device 110 determines the LBT contention window size has been incremented a threshold number of times, and resets the LBT contention window size to the minimum value.

Particular embodiments include signaling of different information using a single LBT priority field depending on the signaled LBT type. According to some embodiments, wireless device 110 receives, from network node 120, an LBT type and an LBT priority class. When the received LBT type indicates that wireless device 110 should perform a fixed duration clear channel assessment (CCA), wireless device 110 transmits uplink data with a quality of service type based on the received LBT priority class. The received LBT priority class refers to the priority class that the network node used to obtain downlink channel access to send the LBT type and the LBT priority class. When the received LBT type indicates that wireless device 110 should perform an LBT procedure with random backoff, wireless device 110 performs the LBT procedure with random backoff according to the received LBT priority class.

In particular embodiments, wireless device 110 receives the LBT type and LBT priority class in an uplink grant. The LBT procedure with random backoff may comprise a category 4 LBT for physical uplink shared channel (PUSCH) transmission on a licensed assisted access (LAA) secondary cell. When the received LBT type indicates that wireless device 110 should perform an LBT procedure with random backoff, wireless device 110 may transmit uplink data with a quality of service type independent of the received LBT priority class.

Particular embodiments include explicit signaling with contention window management done by network node 120. A single bit may be used to indicate an increase or a decrease in contention window size.

According to some embodiments, network node 120 determines wireless device 110 should increase or decrease a contention window size used for performing an LBT procedure, and sends a contention window size to wireless device 110.

In particular embodiments, sending the contention window size to wireless device 110 comprises sending a single bit to wireless device 110. A first value of the single bit instructs wireless device 110 to increment the contention window size used for performing the LBT procedure, and a second value of the single bit instructs wireless device 110 to reset the contention window size used for performing the LBT procedure to a minimum value.

Sending the contention window size to wireless device 110 may comprise sending multiple bits to wireless device 110. The multiple bits represent a particular contention window size of the possible contention window sizes across all LBT priority classes.

Although particular embodiments are described with respect to licensed or unlicensed spectrum, license assisted access, and/or carrier aggregation, the embodiments described herein apply equally to uplink and downlink scheduling in any spectrum and with respect to a single cell or any combination of cells.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 13A below. Similarly, a network node may include any suitable combination of hardware and/or software. For example, in particular embodiments, a network node, such as network node 120, may include the components described with respect to FIG. 14A below.

Some embodiments include implicit signaling with contention window management at the UE. In general, the UE increases or resets the contention window size based on the most recent HARQ feedback information available for transport blocks that are transmitted at the beginning of an uplink burst of subframes from the UE. The UE knows whether the current grant is a transmission of a new transport block or a retransmission as indicated by the new data indicator (NDI) for transport blocks that are transmitted under a given HARQ process. The eNB may use some number of HARQ processes in parallel (e.g., 8 or 16). While using the transport blocks in the first subframe of a transmission burst is known for some purposes, UE procedures to achieve implicit signaling from an eNB for contention windows size is disclosed herein.

In particular embodiments, a UE may use the following procedure to increase, or reset to the minimum value, the contention window size for performing LBT prior to transmission of an uplink burst for which the eNB has indicated that LBT using a category 4 random backoff procedure (where contention window sizes can increase) should be performed. For example, the UE may use the most recently scheduled burst of contiguous subframes (excluding the currently scheduled burst) for which the HARQ process number used in the first subframe of the burst also appears in the currently scheduled burst as the reference transmission burst. The HARQ process which satisfies the above condition is used as the reference HARQ process to determine the contention window size.

If the NDI bit for the reference HARQ process is set to 0, indicating a retransmission, then the UE increases the contention window size to the next higher value in the set of contention window sizes for the priority class that was used to perform LBT prior to transmission of the reference transmission burst. If the NDI bit for the reference HARQ process is set to 1, indicating the transmission of a new transport block, the UE resets the contention window size to the minimum value in the set of contention window sizes for the priority class that is being used by the UE to perform LBT prior to transmission of the current transmission burst. The priority class may either be chosen by the UE based on the traffic type it intends to transmit or may be indicated by the eNB in the uplink grants for the current transmission burst.

The reference transmission burst need not have been transmitted after a category 4 LBT procedure with random backoff. The reference transmission burst may also have been transmitted by using a short 25 microsecond clear channel assessment (CCA) as well. An example is illustrated in FIG. 9.

Figure 9:
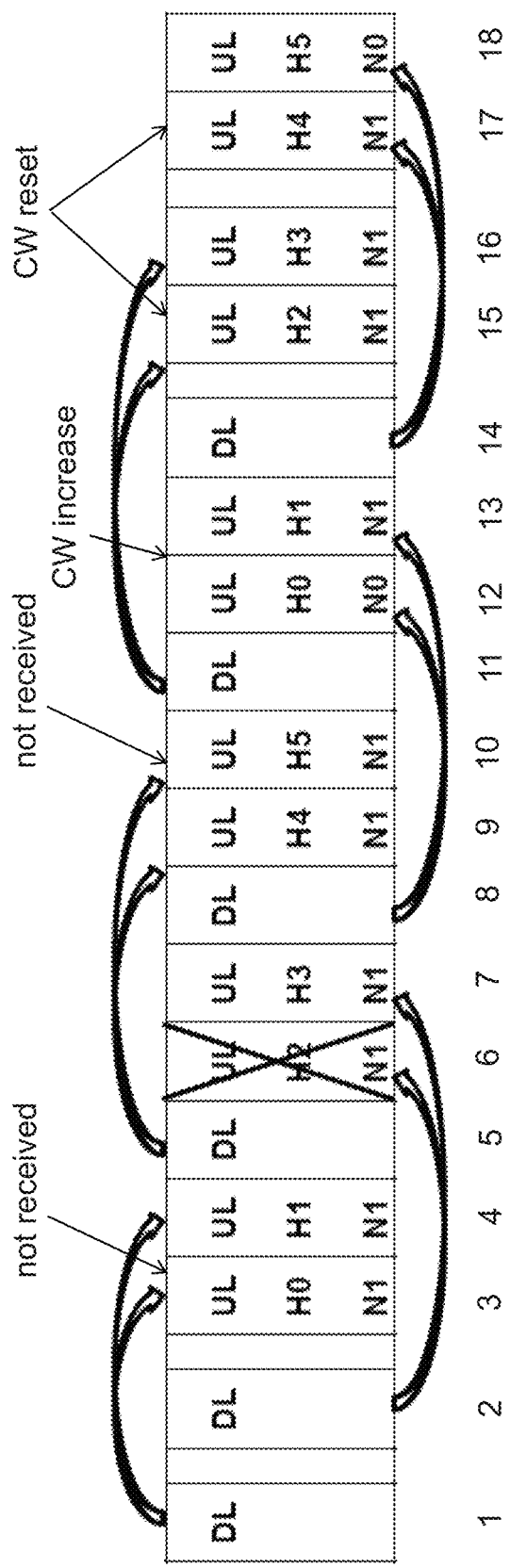
FIG. 9 illustrates an example sequence of subframes for implicitly determining an LBT contention window size, according to some embodiments.

FIG. 9 illustrates an example sequence of subframes for implicitly determining an LBT contention window size, according to some embodiments. The illustrated example includes subframes numbered 1 to 18.

In the illustrated example, the arrows indicate the downlink and uplink subframes where grants are transmitted in the downlink subframes to schedule uplink data in the uplink subframes. For example, downlink subframe 1 includes a grant for uplink subframes 3 and 4.

The tags H0, H1, etc. indicate the HARQ process numbers. For example, H0 denotes HARQ process number 0. The tag N1 indicates that the new data indicator is 1, which indicates to the UE that the grant is for a new data transport block. Similarly, N0 indicates that the new data indicator is 0, which means that the grant is for a retransmission of a transport block that was incorrectly received. A subframe that is crossed out indicates that the UE did not successfully complete the LBT procedure, and thus nothing was transmitted in the subframe.

Subframes 3 and 10 are subframes in which the UE transmitted but the eNB did not receive the transport block correctly. Subframe 12 is the subframe prior to which the UE increased the contention window size. Subframes 15 and 17 are subframes for which the UE resets the contention window size to the minimum value. This includes the case where the contention window size was already at the minimum value so that the reset does not change the contention window size. The reference HARQ processes are HARQ processes H0, H3 and H4. Although a particular sequence of subframes is illustrated, the particular sequence is an example and the embodiments described herein may apply to any sequence of subframes.

As illustrated, subframe 12 is the first subframe where the contention window size is increased. This is because this transmission burst has a HARQ process H0, which also appeared in the first subframe of the reference burst. In this example, the reference burst is the first uplink burst in the figure (i.e., uplink burst staring at subframe 3).

The first subframe of this burst (subframe 3) corresponding to HARQ process 0 was detected by the eNB to have been transmitted but was not received correctly. This is indicated by the NDI being 0 the next time HARQ process H0 is used, which is in subframe 12.

In a subsequent transmission burst of contiguous subframes, HARQ process H3 qualifies as a reference HARQ process. The reference transmission burst for this process is the transmission burst where the first subframe is crossed out in the figure (burst starting at subframe 6) indicating that LBT was not successful prior to this subframe (the LBT prior to this reference subframe need not follow a category 4 LBT procedure with random backoff). Thus, the first transmitted subframe in this burst was the next subframe corresponding to HARQ process H3. Because this transport block was received correctly as indicated by the NDI value of 1, in the current transmission burst, the contention window size is reset prior to the first subframe in the transmission burst starting at subframe 15.

The HARQ process in the first subframe in the next transmission burst also qualifies as a reference HARQ process, which leads to a reset of the contention window. However, in this case the contention window was already at its minimum value, although the UE may choose a new minimum value if a different priority class is used.

In the example disclosed above, the UE increases the contention window size to the next higher value only if the NDI bit for the reference HARQ process is set to 0 and the device actually transmitted the reference HARQ process as the first subframe of the prior transmission burst. This is because there are two types of reasons to cause a HARQ process to retransmit. The first reason is that the UE transmitted the transport block but a collision happened. For these cases, the retransmission should use a larger contention window size. The second reason is that the UE was not able to transmit the transport block in the prior scheduled transmission burst based on the LBT protocol. That is, the UE observed an occupied channel condition and refrained from transmission to avoid collision. For these cases, the contention window size should not be increased.

Other embodiments may modify the criteria for selecting the reference subframe. The particular example illustrated in FIG. 9 may be generalized by the examples described with respect to FIG. 10.

Figure 10:
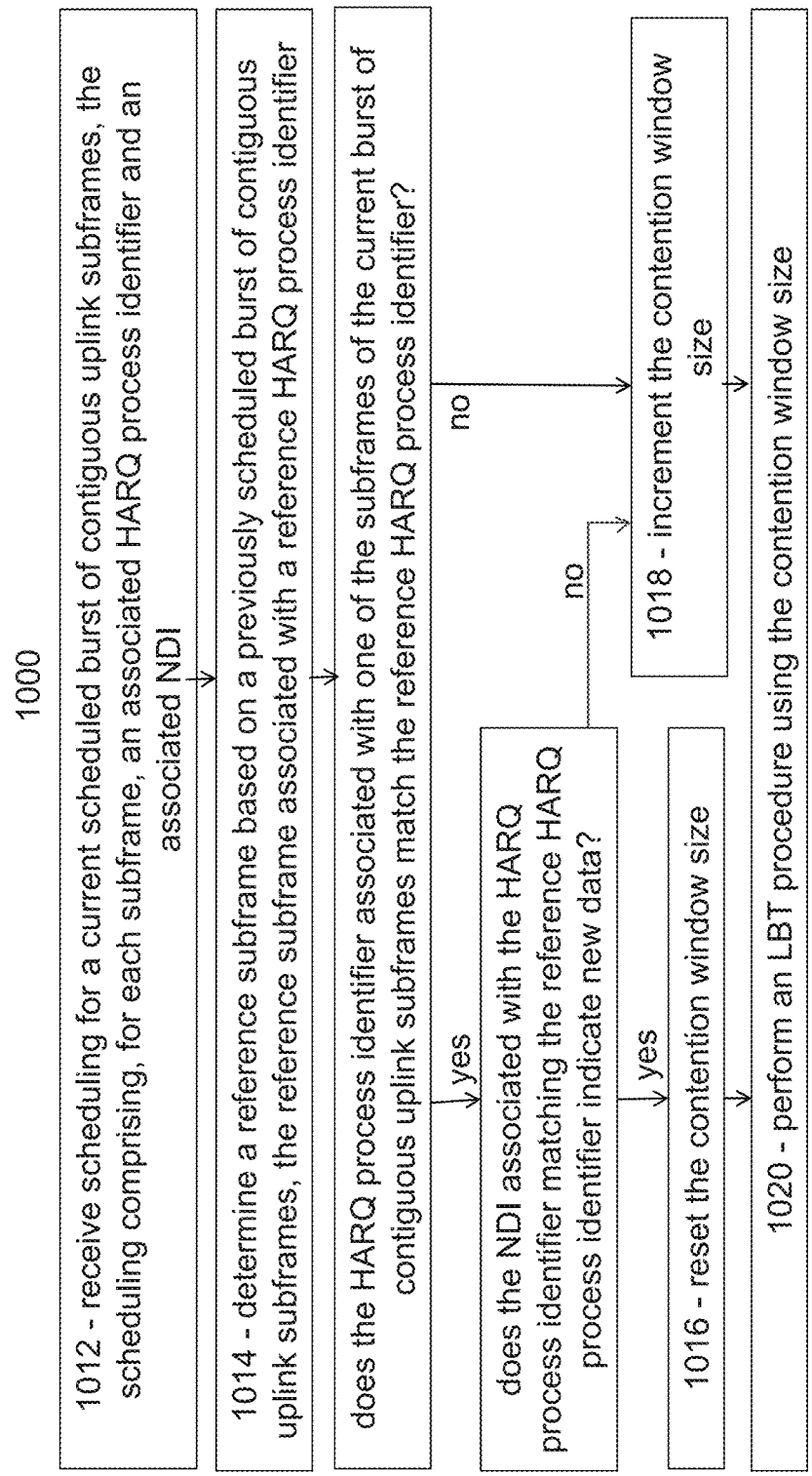
FIG. 10 is a flow diagram illustrating an example method in a user equipment, according to some embodiments.

FIG. 10 is a flow diagram illustrating an example method in a user equipment, according to some embodiments. In particular embodiments, one or more steps of FIG. 10 may be performed by components of wireless network 100 described with respect to FIG. 8.

The method begins at step 1012, where a wireless device receives scheduling for a current scheduled burst of contiguous uplink subframes. The scheduling comprises, for each subframe, an associated HARQ process identifier and an associated NDI. For example, wireless device 110 may receive scheduling (e.g., uplink grant) from network node 120. As illustrated in FIG. 9, the scheduling may include a HARQ process identifier and an NDI value indicating whether network node 120 successfully received a previous uplink transport block.

At step 1014, the wireless device determines a reference subframe based on a previously scheduled burst of contiguous uplink subframes. The reference subframe is associated with a reference HARQ process identifier. For example, wireless device 110 may determine a reference subframe based on a previously scheduled burst of contiguous uplink subframes.

In some embodiments, wireless device 110 may determine the reference subframe by determining the most recent previously-scheduled burst of contiguous uplink subframes for which the associated HARQ process identifier is also found in the received scheduling for the current scheduled burst of contiguous uplink subframes (e.g., if any HARQ process identifier in the previous burst is also found in the current burst). In some embodiments, wireless device 110 may determine the reference subframe by determining the most recent previously-scheduled burst of contiguous uplink subframes for which the HARQ process identifier associated with the first subframe of the previously-scheduled burst of contiguous uplink subframes is also found in the received scheduling for the current scheduled burst of contiguous uplink subframes, as described with respect to FIG. 9.

In some embodiments, wireless device 110 may determine the reference subframe by determining the first uplink subframe transmitted at least a threshold time prior to receiving the scheduling for the current scheduled burst of contiguous uplink subframes. For example, the threshold time may be 4 ms, which corresponds to the uplink grant delay and/or the maximum allowed transmission duration, as described in the Introduction section.

When the wireless device determines that the HARQ process identifier associated with at least one of the subframes of the current scheduled burst of contiguous uplink subframes matches the reference HARQ process identifier and the associated NDI indicates new data, then the method continues to step 1016 where the wireless device resets the contention window size. For example, wireless device 110 may reset the LBT contention window size to a minimum value of a set of values associated with a priority class used by wireless device 110 to perform LBT prior to receiving the scheduling for the current scheduled burst of contiguous uplink subframes.

When the wireless device determines the HARQ process identifier associated with at least one of the subframes of the current scheduled burst of contiguous uplink subframes matches the reference HARQ process identifier and the associated NDI indicates a retransmission, or when the wireless device determines none of the HARQ process identifiers associated with the current scheduled burst of contiguous uplink subframes match the reference HARQ process identifier, the method continues to step 1018 where wireless device increments the LBT contention window size. For example, wireless device 110 may increment the LBT contention window size to a next value in a set of values associated with a priority class used by wireless device 110 to perform LBT prior to the determined reference subframe.

At step 1020, the wireless device performs an LBT procedure using the contention window size. For example, wireless device 110 may perform an LBT procedure using the contention window size determined at steps 1016 or 1018. In particular embodiments, performing the LBT procedure for the current scheduled burst of contiguous uplink subframes comprises performing a category 4 LBT for physical uplink shared channel (PUSCH) transmission on a licensed assisted access (LAA) secondary cell.

Modifications, additions, or omissions may be made to method 1000. Additionally, one or more steps in method 1000 of FIG. 10 may be performed in parallel or in any suitable order. The steps of method 1000 may be repeated over time as necessary.

Particular embodiments include signaling of different information using a single LBT priority field. The meaning of the LBT priority field may vary depending on a signaled LBT type. The LBT type that should be used for an assigned uplink subframe can be signaled to the UE in an uplink grant message. In addition, the message can also include a field for LBT priority class (e.g., 2 bits) that conveys additional information to the UE depending on the signaled LBT type.

As one specific example, when the LBT type indicates that the UE should perform a CCA of fixed duration (typically 25 microseconds), the LBT priority class field conveys to the UE the priority class that was used to obtain channel access on the downlink by the eNB to transmit the uplink grant. The UE may use this information as an indication that the grant is to be used to transmit traffic with a QoS type that is mapped to this priority class or higher. In some embodiments, the UE may have the freedom to override the eNB's intention for the grant and use its discretion on which QoS traffic should be sent.

When the LBT type indicates that the UE should perform a Category 4 LBT procedure with random backoff, the LBT priority class field conveys the priority class that the UE should use to perform LBT with random backoff. The UE performs a category 4 LBT procedure according to the indicated priority class with contention window sizes chosen either by the UE or that are received by the UE as described in the previous embodiments.

In some embodiments, the UE may use the signaled LBT priority class for its category 4 procedure but uses its discretion on which QoS traffic is finally sent in the assigned subframe. In other embodiments, the UE changes the priority class used for LBT according to its discretion, thus overriding the eNB indication, depending on the traffic type that is intended to be sent in the subframe. A generalized example of these embodiments is illustrated in FIG. 11.

Figure 11:
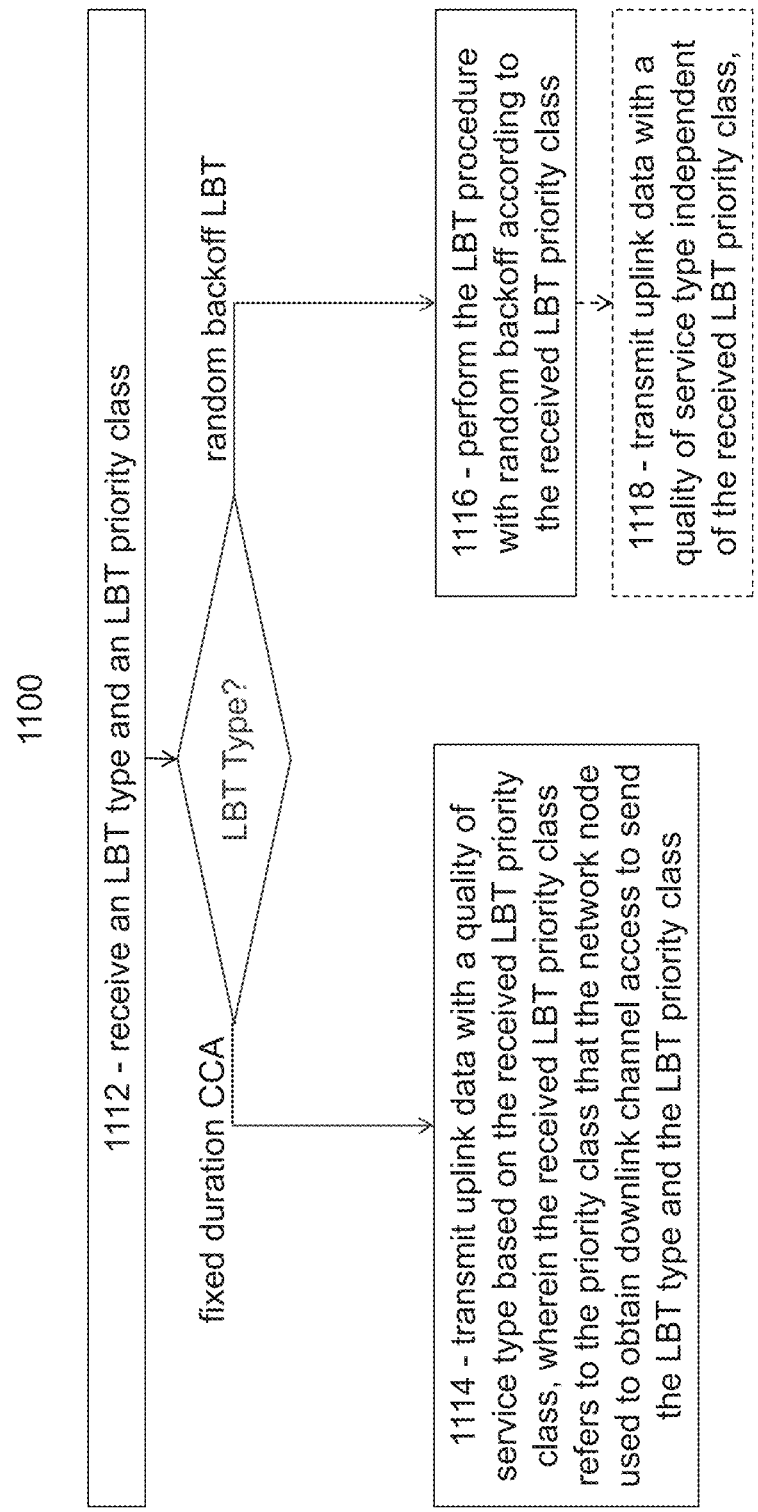
FIG. 11 is a flow diagram illustrating another example method in a user equipment, according to some embodiments.

FIG. 11 is a flow diagram illustrating another example method in a user equipment, according to some embodiments. In particular embodiments, one or more steps of FIG. 11 may be performed by components of wireless network 100 described with respect to FIG. 8.

The method begins at step 1112, where a wireless device receives an LBT type and an LBT priority class. For example, wireless device 110 may receive an LBT type (e.g., category 4 LBT or fixed duration CCA) and an LBT priority class (e.g., priority class 1-4) from network node 120. Wireless device 110 may receive one or both of the LBT type and LBT priority class in an uplink grant.

When the received LBT type indicates that the UE should perform a fixed duration CCA, the method continues to step 1114. At step 1114, the wireless device transmits uplink data with a quality of service type based on the received LBT priority class. The received LBT priority class refers to the priority class that the network node used to obtain downlink channel access to send the LBT type and the LBT priority class. For example, wireless device 110 may transmit uplink data using a QoS based on the received LBT priority class.

When the received LBT type indicates that the UE should perform an LBT procedure with random backoff, the method continues to step 1116. At step 1116 the wireless device performs the LBT procedure with random backoff according to the received LBT priority class. For example, wireless device 110 may perform a category 4 LBT for PUSCH transmission on a LAA secondary cell using the received LBT priority class.

After performing a successful LBT procedure, the wireless device may transmit uplink data. In some embodiments, the wireless device may transmit the uplink data with a QoS based on the received LBT priority class, or the wireless device may transmit the uplink data independent of the received LBT priority class.

At step 1118, the wireless device transmits uplink data with a quality of service type independent of the received LBT priority class. For example, wireless device 110 may transmit uplink data to network node 120 using any appropriate QoS.

Modifications, additions, or omissions may be made to method 1100. Additionally, one or more steps in method 1100 of FIG. 11 may be performed in parallel or in any suitable order. The steps of method 1100 may be repeated over time as necessary.

In some embodiments described above, the UE may incur increased complexity to perform the contention window management. Other embodiments may avoid the complexity, which may instead be transferred to the eNB. For example, the eNB may determine when the contention window size should be increased or decreased.

Particular embodiments may include two methods of indicating the contention window size. In the first method, the eNB directly indicates the contention window size to the UE. For example, 4 bits may be used to choose between 9 possible contention window sizes across all priority classes.

In the second method, the eNB may use one bit to indicate whether the contention window should be increased or reset. For example, when the bit is 1 the UE increases the contention window, and when the bit is 0 the UE may reset the contention window size.

Furthermore, whenever the eNB indicates that the contention window may be reset, it may also change the priority class that is to be used (e.g., using two bits). In some embodiments, the priority class is only changed by the eNB when the contention window is reset.

In some embodiments, the UE may not be indicated a priority class. The UE may be indicated a starting contention window size. This may be done via dynamic signaling in a grant or assignment message or it may be done on a semi-static time scale via radio resource control (RRC) signaling from a higher layer. After the initial contention window size is signaled, a single bit is used to indicate whether the contention window size should be increased or reset to the starting contention window size.

Figure 12:
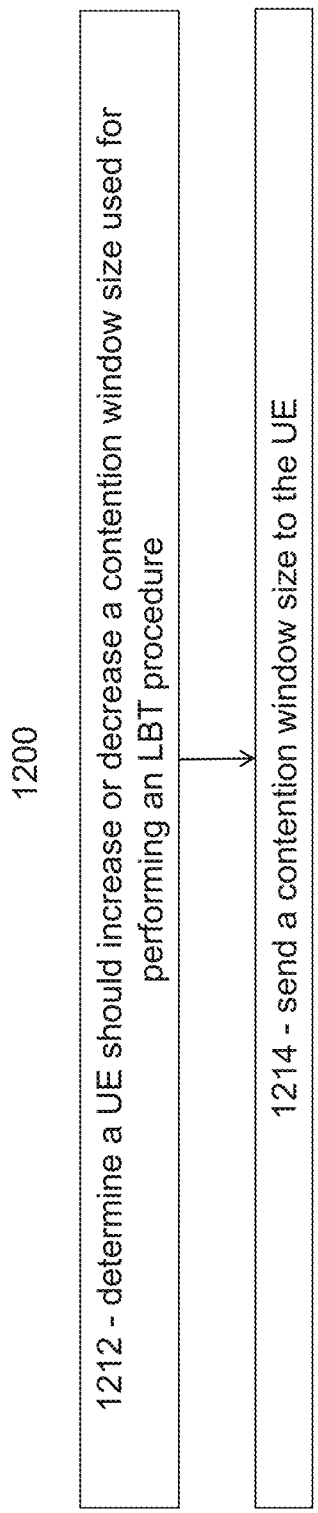
FIG. 12 is a flow diagram illustrating an example method in a network node, according to some embodiments.

FIG. 12 is a flow diagram illustrating an example method in a network node, according to some embodiments. In particular embodiments, one or more steps of FIG. 12 may be performed by components of wireless network 100 described with respect to FIG. 8.

The method begins at step 1212, where a network node determines a wireless device should increase or decrease a contention window size used for performing an LBT procedure. For example, network node 120 may determine, based on HARQ feedback or any other suitable metric or measurement, that wireless device 110 should increase its contention window size (e.g., because network node 120 failed to successfully decode a transport block received from wireless device 110).

At step 1214, the network node sends the contention window size to the wireless device. For example, network node 120 sends the contention window size to wireless device 110. Network node 120 may send a single bit, where a first value indicates to increase the contention window size and a second value indicates to reset the contention window size. Network node may send multiple bits, the multiple bits indicating one of a particular contention window size and/or priority class.

Modifications, additions, or omissions may be made to method 1200. Additionally, one or more steps in method 1200 of FIG. 12 may be performed in parallel or in any suitable order. The steps of method 1200 may be repeated over time as necessary.

Figure 13B:
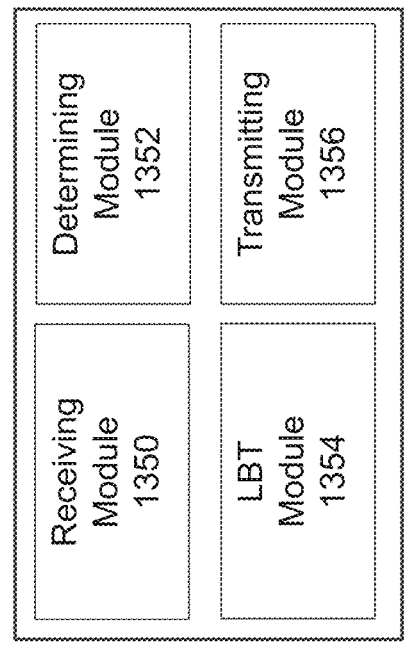
FIG. 13B is a block diagram illustrating example components of a wireless device.
Figure 13A:
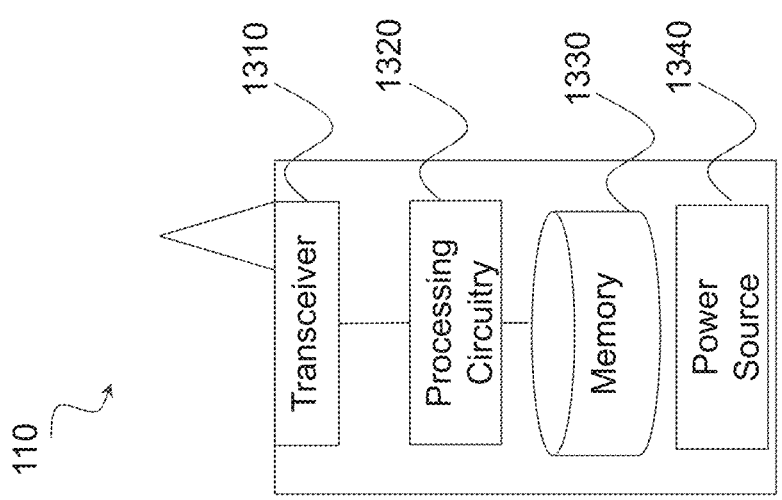
FIG. 13A is a block diagram illustrating an example embodiment of a wireless device.

FIG. 13A is a block diagram illustrating an example embodiment of a wireless device. The wireless device is an example of the wireless devices 110 illustrated in FIG. 8. In particular embodiments, the wireless device is capable of performing LBT procedures before transmitting in the uplink.

For example, the wireless device receives scheduling for a current burst of contiguous uplink subframes. The scheduling comprises, for each subframe of the burst of contiguous uplink subframes, an associated HARQ process identifier and an associated NDI. The wireless device may determine a reference subframe based on a previously-scheduled burst of contiguous uplink subframes. The reference subframe is associated with a reference HARQ process identifier.

When the wireless device determines that the HARQ process identifier associated with at least one of the subframes of the current scheduled burst of contiguous uplink subframes matches the reference HARQ process identifier and the associated NDI indicates new data, the wireless device may reset the LBT contention window size to a minimum value. When the wireless device determines that the HARQ process identifier associated with at least one of the subframes of the current scheduled burst of contiguous uplink subframes matches the reference HARQ process identifier and the associated NDI indicates a retransmission, or when the wireless device determines none of the HARQ process identifiers associated with the current scheduled burst of contiguous uplink subframes match the reference HARQ process identifier, the wireless device may increment the LBT contention window size.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

In particular embodiments, processing circuitry 1320 in communication with transceiver 1310 performs LBT procedures before transmitting in the uplink. For example, processing circuitry 1320 in communication with transceiver 1310 receives scheduling for a current burst of contiguous uplink subframes, determine a reference subframe based on a previously-scheduled burst of contiguous uplink subframes, and adjusts an LBT contention window based on the reference subframe.

Other embodiments of the wireless device may include additional components (beyond those shown in FIG. 13A) responsible for providing certain aspects of the wireless device's functionality, including any of the functionality described above and/or any additional functionality (including any functionality necessary to support the solution described above).

FIG. 13B is a block diagram illustrating example components of a wireless device 110. The components may include receiving module 1350, determining module 1352, LBT module 1354, and transmitting module 1356.

Receiving module 1350 may perform the receiving functions of wireless device 110. For example, receiving module 1350 may receive uplink scheduling from a network node. In some embodiments, receiving module 1350 may receive configuration information, such as an indication of an LBT contention window size, from a network node. Receiving module 1350 may perform the receiving functions described in any of the examples above, including FIGS. 9-11. In certain embodiments, receiving module 1350 may include or be included in processing circuitry 1320. In particular embodiments, receiving module 1350 may communicate with determining module 1352, LBT module 1354, and transmitting module 1356.

Determining module 1352 may perform the determining functions of wireless device 110. For example, determining module 1352 may determine a reference subframe and determine a contention window size as described in any of the examples above, including FIGS. 9-11. In certain embodiments, determining module 1352 may include or be included in processing circuitry 1320. In particular embodiments, determining module 1352 may communicate with receiving module 1350, LBT module 1354, and transmitting module 1356.

LBT module 1354 may perform the listen-before-talk functions of wireless device 110. For example, LBT module 1354 may perform an LBT procedure with random backoff or perform a fixed duration clear channel assessment. LBT module 1354 may increment or rest a contention window size for performing LBT. In certain embodiments, LBT module 1354 may include or be included in processing circuitry 1320. In particular embodiments, LBT module 1354 may communicate with receiving module 1350, determining module 1352, and transmitting module 1356.

Transmitting module 1356 may perform the transmitting functions of wireless device 110. For example, transmitting module 1356 may transmit uplink subframes to network node 120. In certain embodiments, transmitting module 1356 may include or be included in processing circuitry 1320. In particular embodiments, transmitting module 1356 may communicate with receiving module 1350, determining module 1352 and LBT module 1354.

Figure 14B:
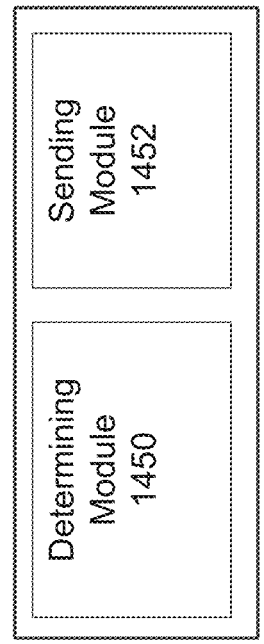
FIG. 14B is a block diagram illustrating example components of a network node.
Figure 14A:
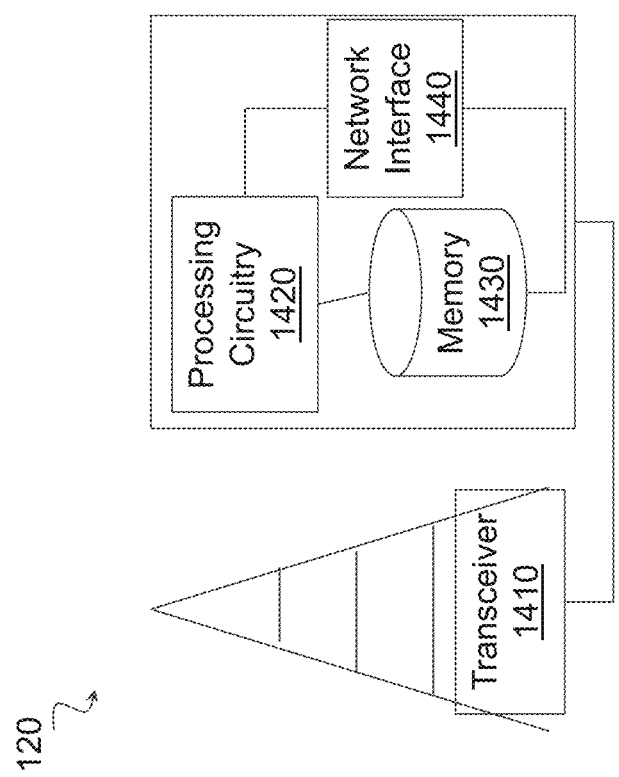
FIG. 14A is a block diagram illustrating an example embodiment of a network node.

FIG. 14A is a block diagram illustrating an example embodiment of a network node. The network node is an example of the network node 120 illustrated in FIG. 8. In particular embodiments, the network node is capable of managing contention window sizes and signaling the contention window size to a wireless device. For example, the network node may determine a wireless device should increase or decrease a contention window size used for performing an LBT procedure, and send a contention window size to the wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIG. 13A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

In particular embodiments, processing circuitry 1420 in communication with transceiver 1410 determines a wireless device should increase or decrease a contention window size used for performing an LBT procedure, and sends a contention window size to the wireless device.

Other embodiments of network node 120 include additional components (beyond those shown in FIG. 14A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 14B is a block diagram illustrating example components of a network node 120. The components may include determining module 1450 and sending module 1452.

Determining module 1450 may perform the determining functions of network node 120. For example, determining module 1450 may determine a contention window size. In certain embodiments, determining module 1450 may include or be included in processing circuitry 1420. In particular embodiments, determining module 1450 may communicate with sending module 1452.

Sending module 1452 may perform the sending functions of network node 120. For example, sending module 1452 may send a contention window size to wireless device 110. In certain embodiments, sending module 1452 may include or be included in processing circuitry 1420. In particular embodiments, sending module 1452 may communicate with determining module 1450.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
ACK Acknowledgement
BTS Base Transceiver Station
CCA Clear Channel Assessment
CW Contention Window
D2D Device to Device
DCF Distributed Coordination Function
DIPS DCF Inter-Frame Spacing
DL Downlink
eNB eNodeB
FDD Frequency Division Duplex
HARQ Hybrid Automatic Repeat Request
LAA License Assisted Access
LBT Listen-Before-Talk
LTE Long Term Evolution
MAC Medium Access Control
M2M Machine to Machine
MIMO Multi-Input Multi-Output
MRBC Multiple Random Backoff Channels
MTC Machine Type Communication
NAK Negative Acknowledgement
NR New Radio
PDSCH Physical Downlink Shared Channel
PIFS PCF Inter-Frame Spacing
PUCCH Physical Uplink Control Channel
QCI QoS Class Indicator
QoS Quality of Service
RAN Radio Access Network
RAT Radio Access Technology
RB Radio Bearer
RBS Radio Base Station
RNC Radio Network Controller
RRC Radio Resource Control
RRH Remote Radio Head
RRU Remote Radio Unit
SCell Secondary Cell
SRBC Single Random Backoff Channel
SIFS Short Inter-Frame Spacing
TDD Time Division Duplex
UE User Equipment
UL Uplink
UTRAN Universal Terrestrial Radio Access Network
WAN Wireless Access Network

The invention claimed is:

1. A method for use in a user equipment (UE) of managing a listen-before-talk (LBT) contention window size, the method comprising:
   receiving scheduling for a current burst of contiguous uplink subframes, the scheduling comprising, for each subframe of the burst of contiguous uplink subframes, an associated hybrid automatic repeat request (HARQ) process identifier and an associated new data indicator (NDI);
   determining a reference subframe based on a previously-scheduled burst of contiguous uplink subframes, the reference subframe associated with a reference HARQ process identifier; and
   when the UE determines the HARQ process identifier associated with at least one of the subframes of the current scheduled burst of contiguous uplink subframes matches the reference HARQ process identifier and the associated NDI indicates new data, resetting the LBT contention window size to a minimum value.

2. The method of claim 1, wherein determining the reference subframe comprises:
   determining the most recent previously-scheduled burst of contiguous uplink subframes for which the associated HARQ process identifier is also found in the received scheduling for the current scheduled burst of contiguous uplink subframes.

3. The method of claim 2, wherein determining the reference subframe comprises:
   determining the most recent previously-scheduled burst of contiguous uplink subframes for which the HARQ process identifier associated with the first subframe of the previously-scheduled burst of contiguous uplink subframes is also found in the received scheduling for the current scheduled burst of contiguous uplink subframes.

4. The method of claim 1, wherein determining the reference subframe comprises determining the first uplink subframe transmitted at least a threshold time prior to receiving the scheduling for the current scheduled burst of contiguous uplink subframes.

5. The method of claim 4, wherein the threshold time is 4 ms.

6. The method of claim 1, wherein resetting the LBT contention window size to a minimum value comprises resetting the LBT contention window size to a minimum value of a set of values associated with a priority class used by the UE to perform LBT prior to receiving the scheduling for the current scheduled burst of contiguous uplink subframes.

7. The method of claim 1, wherein incrementing the LBT contention window size comprises incrementing the LBT contention window size to a next value in a set of values associated with a priority class used by the UE to perform LBT prior to the determined reference subframe.

8. The method of claim 1, wherein performing the LBT procedure for the current scheduled burst of contiguous uplink subframes comprises performing a category 4 LBT for physical uplink shared channel (PUSCH) transmission on a licensed assisted access (LAA) secondary cell.

9. The method of claim 1, further comprising:
determining the LBT contention window size has been incremented a threshold number of times; and
resetting the LBT contention window size to the minimum value.

10. The method of claim 1, further comprising:
when the UE determines none of the HARQ process identifiers associated with the current scheduled burst of contiguous uplink subframes matches the reference HARQ process identifier, incrementing the LBT contention window size.

11. A user equipment (UE) capable of managing a listen-before-talk (LBT) contention window size, the UE comprising processing circuitry operable to:
receive scheduling for a current burst of contiguous uplink subframes, the scheduling comprising, for each subframe of the burst of contiguous uplink subframes, an associated hybrid automatic repeat request (HARQ) process identifier and an associated new data indicator (NDI);
determine a reference subframe based on a previously-scheduled burst of contiguous uplink subframes, the reference subframe associated with a reference HARQ process identifier; and
when the UE determines the HARQ process identifier associated with at least one of the subframes of the current scheduled burst of contiguous uplink subframes matches the reference HARQ process identifier and the associated NDI indicates new data, reset the LBT contention window size to a minimum value.

12. The UE of claim 11, wherein the processing circuitry determines the reference subframe by determining the most recent previously-scheduled burst of contiguous uplink subframes for which the associated HARQ process identifier is also found in the received scheduling for the current scheduled burst of contiguous uplink subframes.

13. The UE of claim 12, wherein the processing circuitry determines the reference subframe by determining the most recent previously-scheduled burst of contiguous uplink subframes for which the HARQ process identifier associated with the first subframe of the previously-scheduled burst of contiguous uplink subframes is also found in the received scheduling for the current scheduled burst of contiguous uplink subframes.

14. The UE of claim 11, wherein the processing circuitry determines the reference subframe by determining the first uplink subframe transmitted at least a threshold time prior to receiving the scheduling for the current scheduled burst of contiguous uplink subframes.

15. The UE of claim 14, wherein the threshold time is 4 ms.

16. The UE of claim 11, wherein the processing circuitry resets the LBT contention window size to a minimum value of a set of values associated with a priority class used by the UE to perform LBT prior to receiving the scheduling for the current scheduled burst of contiguous uplink subframes.

17. The UE of claim 11, wherein the processing circuitry increments the LBT contention window size to a next value in a set of values associated with a priority class used by the UE to perform LBT prior to the determined reference subframe.

18. The UE of claim 11, wherein the processing circuitry performs the LBT procedure for the current scheduled burst of contiguous uplink subframes by performing a category 4 LBT for physical uplink shared channel (PUSCH) transmission on a licensed assisted access (LAA) secondary cell.

19. The UE of claim 11, the processing circuitry further operable to:
determine the LBT contention window size has been incremented a threshold number of times; and
reset the LBT contention window size to the minimum value.

20. The UE of claim 11, further comprising:
when the UE determines none of the HARQ process identifiers associated with the current scheduled burst of contiguous uplink subframes matches the reference HARQ process identifier, incrementing the LBT contention window size.

* * * * *